(12) United States Patent
Din et al.

(10) Patent No.: US 12,412,896 B2
(45) Date of Patent: Sep. 9, 2025

(54) ELECTRODE MATERIALS, ELECTRODES, DEVICES, AND METHODS OF MAKING THEREOF

(71) Applicant: Din Ventures, LLC, Chicago, IL (US)

(72) Inventors: Rashed Din, Morton Grove, IL (US); Gurpreet Singh, Chicago, IL (US); Sai Aman Gopisetti, Chicago, IL (US)

(73) Assignee: Din Ventures, LLC, Chicago, IL (US)

( * ) Notice: Subject to any disclaimer, the term of this patent is extended or adjusted under 35 U.S.C. 154(b) by 0 days.

(21) Appl. No.: 19/048,603

(22) Filed: Feb. 7, 2025

(65) Prior Publication Data

US 2025/0210659 A1    Jun. 26, 2025

Related U.S. Application Data

(63) Continuation of application No. 18/799,795, filed on Aug. 9, 2024.

(60) Provisional application No. 63/518,590, filed on Aug. 10, 2023, provisional application No. 63/518,595, filed on Aug. 10, 2023.

(51) Int. Cl.
| | |
|---|---|
| *H01M 4/587* | (2010.01) |
| *C01B 32/184* | (2017.01) |
| *C01B 32/198* | (2017.01) |
| *H01M 4/02* | (2006.01) |

(52) U.S. Cl.
CPC .......... *H01M 4/587* (2013.01); *C01B 32/184* (2017.08); *C01B 32/198* (2017.08); *C01B 2204/22* (2013.01); *C01P 2002/52* (2013.01); *C01P 2002/82* (2013.01); *C01P 2002/85* (2013.01); *C01P 2006/12* (2013.01); *C01P 2006/14* (2013.01); *C01P 2006/16* (2013.01); *C01P 2006/40* (2013.01); *H01M 2004/028* (2013.01)

(58) Field of Classification Search
CPC ............ H01M 4/587; H01M 2004/028; C01B 32/184; C01B 32/198; C01B 2204/22; C01P 2002/52; C01P 2002/82; C01P 2002/85; C01P 2006/12; C01P 2006/14; C01P 2006/16; C01P 2006/40
See application file for complete search history.

(56) References Cited

U.S. PATENT DOCUMENTS

| | | |
|---|---|---|
| 2011/0111299 A1 | 5/2011 | Liu et al. |
| 2012/0088158 A1 | 4/2012 | Liu et al. |
| 2014/0287908 A1 | 9/2014 | Lee et al. |
| 2016/0285095 A1 | 9/2016 | Kang et al. |
| 2016/0307660 A1 | 10/2016 | Gong et al. |

(Continued)

FOREIGN PATENT DOCUMENTS

| | | |
|---|---|---|
| CN | 110217780 A | 9/2019 |
| CN | 110950328 A | 4/2020 |

(Continued)

OTHER PUBLICATIONS

Oct. 4, 2024—International Search Report and Written Opinion, PCT/US2024/041792, 16 pages.

(Continued)

*Primary Examiner* — Daniel S Gatewood
(74) *Attorney, Agent, or Firm* — POLSINELLI PC

(57) ABSTRACT

This invention relates generally to the field of energy storage, batteries, cathodes, and anodes. This invention also relates to anode materials and/or cathode materials and methods to make said materials.

29 Claims, 7 Drawing Sheets

(56) References Cited

U.S. PATENT DOCUMENTS

2018/0076459 A1    3/2018  Lux et al.
2019/0020017 A1    1/2019  Huang et al.
2021/0218110 A1    7/2021  Lanning et al.

FOREIGN PATENT DOCUMENTS

CN    113600138 A  * 11/2021  .......... B01J 20/0259
CN    115708180 A    2/2023
CN    116565223 A    8/2023
KR    10-1998367 B1  7/2018

OTHER PUBLICATIONS

Bag et al., "Nitrogen and Sulfur Dual-Doped Reduced Graphene Oxide: Synergistic Effect of Dopants Towards Oxygen Reduction Reaction," Electrochimica Acta, vol. 163, May 2015 [retrieved on Sep. 20, 2024]. Retrieved from the internet: <URL: https://www.sciencedirect.com/science/article/abs/pii/SOO13468615004168>. Entire document.

Kicinski et al., "Copolycondensation of heterocyclic aldehydes: a general approach to sulfur and nitrogen dually-doped carbon gels," Microporous and Mesoporous Materials, Nov. 28, 2015 [retrieved on Sep. 25, 2024]. Retrieved from the internet: <URL: https://www.sciencedirect.com/science/article/abs/pii/S1387181115006575>. Entire document.

Pohl et al., "Development of a water based process for stable conversion cathodes on the basis of FeF3," Journal of Power Sources, vol. 313, 2016. Entire document.

\* cited by examiner

ELECTRODE MATERIALS, ELECTRODES, DEVICES, AND METHODS OF MAKING THEREOF

CROSS-REFERENCE TO RELATED APPLICATIONS

The present application is a continuation of U.S. application Ser. No. 18/799,795 entitled "ELECTRODE MATERIALS, ELECTRODES, DEVICES, AND METHODS OF MAKING THEREOF", filed on Aug. 9, 2024, and claims the benefit of U.S. Provisional Application No. 63/518,595 entitled "ELECTRODE MATERIALS, ELECTRODES, DEVICES, AND METHODS OF MAKING THEREOF", filed on Aug. 10, 2023, and U.S. Provisional Application No. 63/518,590 entitled "CATHODE MATERIALS, CATHODE, BATTERIES, AND METHODS OF MAKING THEREOF", filed on Aug. 10, 2023, the entire contents of which are entirely incorporated by reference herein.

TECHNICAL FIELD

This invention relates generally to the field of energy storage, supercapacitor, and electrochemical sensors, and more specifically to electrode materials and methods of making the electrode materials.

BACKGROUND

Graphene, graphene oxide (GO), and reduced graphene oxide (rGO) exhibit high electrical conductivity, large surface area, and excellent mechanical properties. Metal oxides, such as $MnO_2$, $RuO_2$, and $Co_3O_4$, have been employed as electrode materials for supercapacitors and batteries due to their high specific capacitance and redox activity. Materials such as polyaniline, polypyrrole, and poly(3,4-ethylenedioxythiophene) (PEDOT) have been used as electrodes in energy storage devices and electrochemical sensors, owing to their high specific capacitance, good conductivity, and reversible redox activity.

There are, however, a variety of shortcomings to carbon containing electrode materials in the prior art, including inferior electrochemical properties, short shelf-life, insufficient doping efficiency, use of hazardous chemicals, limited binder compatibility, lack of versatility, lack of durability, and scalability/manufacturing challenges. Thus, there is a need in for new electrode materials with improved properties.

SUMMARY

An aspect of the present disclosure is an electrode material, an electrode made from the electrode material (e.g., anode material), and methods of making the electrode material and electrode.

Provided herein is an electrode material comprising graphene, a plurality of dopants, and interconnected porous structures comprising a plurality of pores.

In some embodiments of the electrode material, the plurality of dopants comprises nitrogen, sulfur, phosphorous, boron, transition metals, and a combination thereof.

In some embodiments of the electrode material, the plurality of dopants is nitrogen and sulfur.

In some embodiments of the electrode material, the plurality of pores comprises an average pore size ranging from 0.5 nm to 55 nm.

In some embodiments of the electrode material, the plurality of pores comprises an average pore size ranging from 5 nm to 50 nm.

In some embodiments of the electrode material, the plurality of pores comprises a surface area ranging from 400 $m^2/g$ to 1000 $m^2/g$.

In some embodiments of the electrode material, the plurality of pores comprises a surface area ranging from 500 $m^2/g$ to 800 $m^2/g$.

In some embodiments of the electrode material, the plurality of pores comprises an average pore volume ranging from 0.2 $cm^3/g$ to 2.0 $cm^3/g$.

In some embodiments of the electrode material, the plurality of pores comprises an average pore volume ranging from 0.5 $cm^3/g$ to 1.0 $cm^3/g$.

In some embodiments of the electrode material, the plurality of pores comprises an average depth ranging from 5 nm to 150 nm.

In some embodiments of the electrode material, the plurality of pores comprises an average depth ranging from 10 nm to 100 nm.

In some embodiments of the electrode material, the nitrogen and sulfur are derived from natural polymers, thioacetamide, sodium sulfide, elemental sulfur, thiourea, or combinations thereof.

In some embodiments of the electrode material, the natural polymers comprise cellulose, alginate, lignin, or combinations thereof.

In some embodiments, the electrode material formula is $C_xN_yS_zO_w$.

In some embodiments, the electrode material formula is $C_6N_2SO_{10}$.

In some embodiments the electrode comprising the electrode material has an electrical conductivity ranging from 1000 S/m to 5000 S/m.

In some embodiments the electrode comprising the electrode material has a specific surface area ranging from 500 $m^2/g$ to 1500 $m^2/g$.

In some embodiments the electrode comprising the electrode material has a capacity retention of over 90% after one thousand cycles of charge/discharge cycles.

Further provided herein is a composition comprising a porous graphene doped with nitrogen and sulfur.

In some embodiments, the composition comprises deionized water, residual acid, and/or a cross-linking agent.

In some embodiments of the composition the porous graphene doped with nitrogen and sulfur is suitable for use as an electrode material.

Further provided herein is an electrode comprising the disclosed electrode material.

In some embodiments the electrode is an anode.

In some embodiments the electrode is a cathode.

Further provided herein is a device comprising the disclosed electrode material. In some embodiments the device comprises an energy storage device, a supercapacitor, an electrochemical sensor, or combinations thereof.

In some embodiments the energy storage device comprises lithium-ion batteries, sodium-ion batteries, rechargeable batteries, or combinations thereof.

Further provided herein is a method of producing an electrode material for energy storage applications. In some embodiments the method includes the following steps: dispersing graphene oxide in a solvent and ultrasonicating the graphene oxide and the solvent for a first specified time forming a first solution; dissolving a binder in an acid solution forming a second solution; mixing and heating the second solution to a first temperature for a second specified time; adding a dopant source into the second solution forming a third solution; mixing the third solution; adding the first solution into the third solution forming a fourth solution; mixing the fourth solution for a third specified time; cutting metal foam into specified shapes and sizes forming a cut metal foam; dipping the cut metal template into the fourth solution forming a uniformly coated metal foam; adding a cross-linking agent to the uniformly coated metal template to cross-link the nitrogen dopant forming a hydrogel-coated metal foam; treating the hydrogel-coated metal foam with liquid nitrogen and freeze-drying at a second temperature and a first pressure forming a freeze-dried hydrogel-coated metal foam; carbonizing the freeze-dried hydrogel-coated metal foam; dissolving the metal foam template in an etchant forming the electrode material; washing the electrode material with ultrapure water; and drying the electrode material to obtain dried electrode material.

In some embodiments the electrode material is a nitrogen and sulfur doped porous graphene (NSPG).

In some embodiments the solvent is a polar solvent.

In some embodiments the polar solvent comprises deionized water, ethanol, isopropanol, or combinations thereof.

In some embodiments the first specified time first specified time ranges from about 1 hour to about 4 hours.

In some embodiments the binder comprises chitosan.

In some embodiments the acid comprises acetic acid, formic acid, hydrochloric acid, citric acid, or a combination thereof.

In some embodiments the pH of the acid solution ranges from about 4 to about 6.

In some embodiments the first temperature ranges from about 40° C. to about 60° C.

In some embodiments the dopant comprises thiourea.

In some embodiments the second specified time ranges from about 0.5 hour to about 2 hours.

In some embodiments the metal comprises nickel, copper, or combinations thereof.

In some embodiments the third specified time ranges from about 0.5 hour to about 24 hours.

In some embodiments the specified shapes comprise sheets, discs, cylinders, or custom geometries.

In some embodiments the size ranges from about 2 cm to about 100 cm.

In some embodiments the second solution is a uniform homogenous solution.

In some embodiments the cross-linking agent comprises glutaraldehyde, formaldehyde, glyoxal, or combinations thereof.

In some embodiments the cross-linking agent is glutaraldehyde.

In some embodiments the second temperature ranges from about −60° C. to about −30° C.

In some embodiments the first pressure ranges from about 1 Pa to about 15 Pa.

In some embodiments the carbonizing step further comprises heating the hydrogel-coated metal foam to a third temperature for a fourth specified time at a ramp rate in an inert atmosphere.

In some embodiments the third temperature ranges from about 750° C. to about 850° C.

In some embodiments the third temperature ranges about 795° C. to about 805° C.

In some embodiments the fourth specified time ranges from about 1.5 hours to about 4 hours.

In some embodiments the fourth specified time ranges from about 1.9 hours to about 2.1 hours.

In some embodiments the ramp rate ranges from about 2° C./min to about 7° C./min.

In some embodiments the ramp rate ranges from about 4° C./min to about 6° C./min.

In some embodiments the inert atmosphere comprises nitrogen, helium, argon, or combinations thereof.

In some embodiments the etchant comprises aqua regia, nitric acid, hydrochloric acid, sulfuric acid, and combinations thereof.

In some embodiments drying the electrode step is performed in an oven at a fourth temperature.

In some embodiments the fourth temperature ranges from about 70° C. to about 90° C.

Further provided herein is a hydrogel composition comprising shaped nickel (Ni) foam, graphene oxide, chitosan, thiourea, and a crosslinking agent. In some embodiments the hydrogel is formed after the graphene oxide is added to the shaped nickel foam.

In some embodiments the graphene oxide is porous and interconnected.

In some embodiments the graphene oxide is uniformly interconnected.

In some embodiments the graphene oxide is evenly dispersed across the hydrogel surface and the hydrogel core.

In some embodiments the graphene oxide concentration is evenly dispersed throughout the hydrogel.

Further provided herein is an anode comprising the disclosed hydrogel.

Further provided herein is a dipped hydrogel composition comprising shaped nickel (Ni) foam, graphene oxide, chitosan, thiourea, and a crosslinking agent; wherein the hydrogel is formed by (a) dipping the shaped nickel (Ni) foam into a solution comprising graphene oxide, chitosan, thiourea; and (b) adding a crosslinking agent.

Further provided herein comprising shaped nickel (Ni) foam and a solution comprising graphene oxide, chitosan, and thiourea, wherein the solution does not comprise a hydrogel.

Further provided herein is a composition comprising shaped nickel (Ni) foam and a solution comprising graphene oxide, chitosan, and thiourea, wherein the solution does not comprise an aldehyde or crosslinking agent.

Further provided herein is a method of making a dipped hydrogel composition, the method comprising dipping a shaped nickel (Ni) foam into a solution comprising graphene oxide, chitosan, thiourea forming a coated shaped nickel (Ni) foam; adding a cross-linking agent to cross-link the chitosan forming the dipped hydrogel.

DETAILED DESCRIPTION

Figure 1:
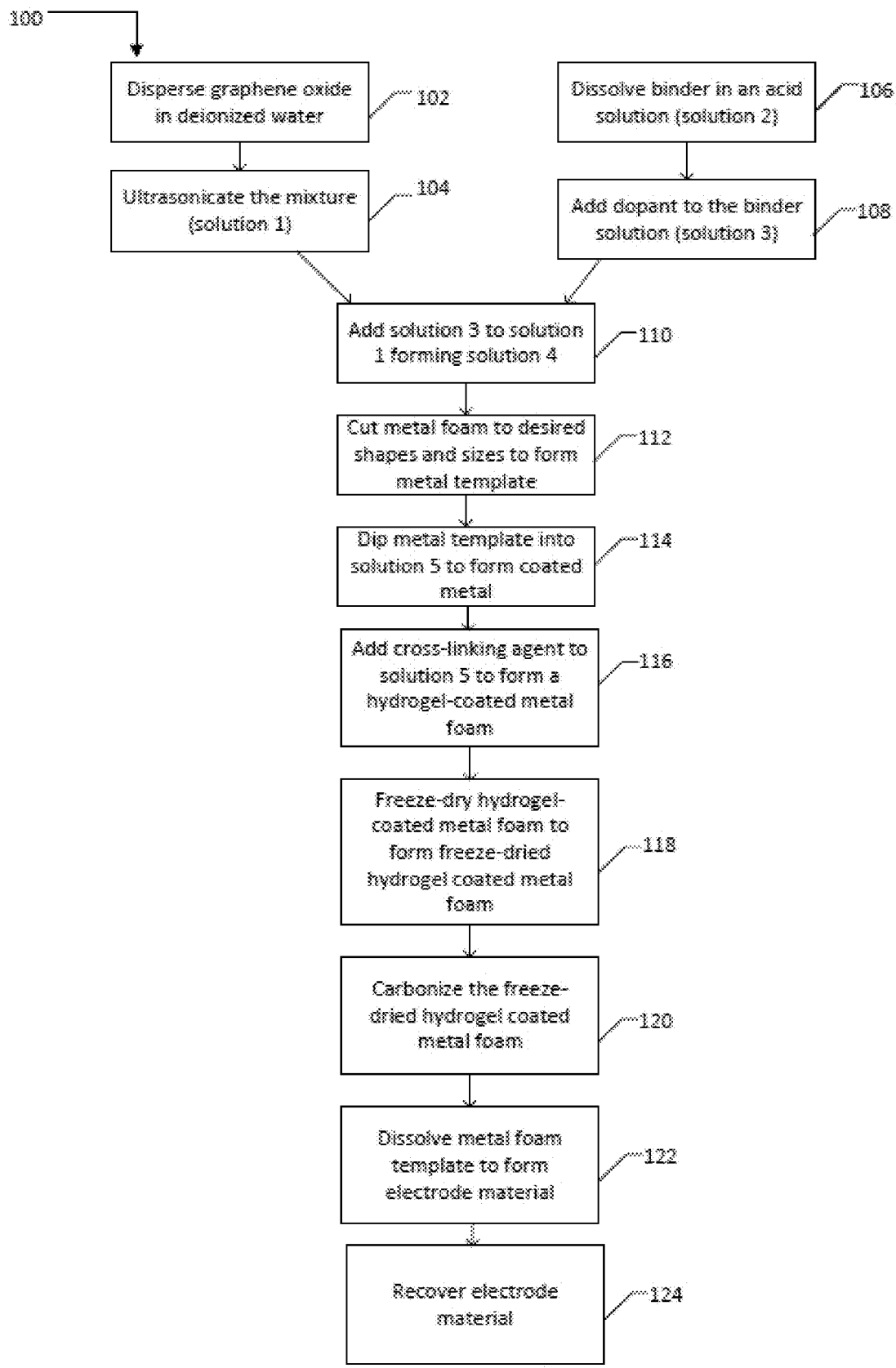
FIG. 1 is a flowchart representation of an example method.

The following description of the embodiments of the invention is not intended to limit the invention to these embodiments but rather to enable a person skilled in the art to make and use this invention.

In one aspect, this disclosure relates to an electrode material, method of making the electrode material, method of making an electrode from the electrode material, and use of the electrode. The electrode may be an anode or a cathode. The electrode material of the present disclosure may be a doped porous graphene material. The doped porous graphene material may be used to develop efficient, compact, and lightweight energy storage solutions, for portable electronic devices, wearable technology, small-scale energy storage industries, supercapacitors, and electrochemical sensors.

Electrode Material—Doped Porous Graphene Material

The electrode material may include a doped porous graphene material. The electrode material may be formed by making doped porous graphene electrode materials from a carbon source, one or more binders, and dopants. The carbon source may be graphene oxide or comprise graphene oxide. The binders include but are not limited to any one of biopolymers such as chitosan, polyvinyl alcohol (PVA), poly(vinylidene fluoride) (PVDF), carboxymethyl cellulose (CMC), or combinations thereof. The dopants include but are not limited to nitrogen, sulfur, phosphorous, boron, transition metals such as iron, nickel, or a combination thereof.

In some aspects, the electrode material may be doped with two or more dopants. For example, the porous graphene may be doped with 2 dopants, 3 dopants, 4 dopants, or 5 dopants. The dopants may be incorporated into the porous graphene. Co-doping with these elements may enhance electrical conductivity, introduce additional redox active sites, and modulate the electronic structure of the materials, leading to improved performance in energy storage devices and electrochemical sensors.

Nitrogen and Sulfur Co-Doped Porous Graphene (NSPG) Material

In some embodiments of the electrode material, the porous graphene is co-doped with nitrogen and sulfur forming a nitrogen and sulfur co-doped porous graphene (NSPG) electrode. These dopants may modulate the electronic structure, improve conductivity, and increase the number of active sites for charge storage and redox reactions, which may result in improved energy storage capacity and electrochemical performance compared to undoped graphene materials.

The chemical structure, chemical formula, and molecular weight of NSPG may vary depending on the specific synthesis conditions and doping concentrations. In some embodiments, nitrogen and sulfur doping levels range from about 2% to about 10% and about 0.5% to about 5%, respectively. For example, the nitrogen level may be from about 2.5% to about 9.5%, about 3.0% to about 9.0%, 3.5% to about 8.5%, about 4.0% to about 8.0%, 4.5% to about 7.5%, about 5.0% to about 7.0%, 5.5% to about 6.5%, or about 6.0% to about 6.5%. For example, the sulfur level may be from about 1.0% to about 4.5%, about 1.5% to about 4.0%, 2.0% to about 3.5%, or about 2.5% to about 3.0%.

These dopants may modulate the electronic structure, improve conductivity, and increase the number of active sites for charge storage and redox reactions, resulting in improved energy storage capacity and electrochemical performance compared to undoped graphene materials.

In some aspects, the disclosed NSPGs may have a about 1 to about 2 orders of magnitude increase in electrical conductivity, about 100 to about 300 times improvement in conductivity, and about 10% to about 50% increase in active sites compared to undoped porous graphene electrodes. These numbers demonstrate the impact of nitrogen and sulfur co-doping on the electronic structure, conductivity, and availability of active sites in graphene, resulting in improved electrochemical performance.

The chemical formula of the NSPG electrode material of the present disclosure is $C_xN_yS_zO_w$, where w, x, y, and z are integers or decimal numbers. In the formula, x ranges from about 1 to about 10, y is about 1 to about 20, w ranges from about 2 to about 20 and z is about 0.5 to about 5.

In some embodiments, the nitrogen and sulfur co-doped porous graphene material includes oxygen. The presence of oxygen in the NSPG material can be beneficial for certain applications. For example, oxygen-containing functional groups can enhance the wettability of the material, improve its stability in aqueous electrolytes, and provide additional active sites for electrochemical reactions. Oxygen may be present in a significant amount and may be comparable to or greater than the carbon content. In some embodiments, the NSPG material may be highly oxidized, which may improve its electrochemical properties.

In some embodiments, w ranges from about 2 to about 20, about 1 to about 19, about 2 to about 18, about 3 to about 17, about 4 to about 16, about 5 to about 15, about 6 to about 14, about 7 to about 13, about 8 to about 12, about 9 to about 11, or about 10 to about 10.5. For example, w may be 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.

In some embodiments, x ranges from about 1 to about 10, about 1.5 to about 9.5, about 2 to about 9, about 2.5 to about 8.5, about 3 to about 8.0, about 3.5 to about 7.5, about 4 to about 7.0, about 4.5 to about 6.5, or about 5.0 to about 6.0. For example, x may be 1, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.75, 9.0, 9.25, 9.5, 9.75, or 10.

In some embodiments, y ranges from about 1 to about 20, about 1.5 to about 19.5, about 2 to about 19, about 2.5 to about 18.5, about 3 to about 18, from about 3.5 to about 17.5, about 4 to about 17, about 4.5 to about 16.5 about 5.0 to about 16, about 5.5 to about 16, about 6.0 to about 15.5, about 6.5 to about 15, about 7.0 to about 14.5, about 7.5 to about 14, about 8 to about 13.5. about 8.5 to about 13, about 9 to about 12.5, about 9.5 to about 12, about 10 to about 11.5, or about 10 to about 10.5. For example, y may be 1, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 10, 10.25, 10.5, 10.75, 11, 11.25, 11.5, 11.75, 12.0, 12.25, 12.5, 12.75, 13.0, 13.25, 13.5, 13.75, 14.0, 14.25, 14.5, 14.75, 15.0, 15.25, 15.5, 15.75, 16.0, 16.25, 16.5, 16.75, 17.0, 17.25, 17.5, 17.75, 18.0, 18.25, 18.5, 18.75, 19.0, 19.25, 19.5, 19.75, or 20.

In some embodiments, z ranges from about 0.5 to about 5, about 0.6 to about 4.5, about 1 to about 4, about 1.5 to about 3.5, about 2 to about 3.0, or about 2.5 to about 2.75. For example, z may be 0.1, 0.2, 0.3, 0.4, 0.5, 0.6, 0.7, 0.8, 0.9, 1.0, 1.1, 1.2, 1.25, 1.3, 1.4, 1.5, 1.6, 1.7, 1.75, 1.8, 1.9, 2.0, 2.1, 2.2, 2.25, 2.3, 2.4, 2.5, 2.6, 2.7, 2.75, 2.8, 2.9, 3.0, 3.1, 3.2, 3.25, 3.3, 3.4, 3.5, 3.6, 3.7, 3.75, 3.8, 3.9, 4.0, 4.1, 4.2, 4.25, 4.3, 4.4, 4.5, 4.6, 4.7, 4.75, 4.8, 4.9, or 5.0.

In some embodiments, the chemical formula of NSPG may be $C_6N_2S$, indicating a graphene lattice with two nitrogen and one sulfur atom incorporated per six carbon atoms.

The morphology of NSPG may be observed using advanced microscopy techniques. For example, Field Emission Scanning Electron Microscope (FESEM) images may reveal the surface morphology, showing a highly porous structure with interconnected graphene-based sheets. The disclosed NSPGs structures may exhibit a mixture of structures rather than being uniform, considering the fabrication method and the presence of multiple components. NSPG material consists of a combination of graphene-based sheets with various degrees of nitrogen and sulfur doping, interconnected through a porous network. These sheets may possess some degree of stacking, resulting in the presence of multiple crystal domains within the NSPG structure. The incorporation of chitosan, thiourea, and the use of a nickel foam template may lead to variations in crystal orientation, doping distribution, and pore size throughout the NSPG material.

In some aspects, Transmission Electron Microscope (TEM) images may provide a detailed view of the internal nanostructures, showcasing the porous network and the distribution of nitrogen and sulfur dopants within the graphene framework. These images demonstrate the morphology of NSPG for various electrochemical applications.

In certain aspects, a gas adsorption analyzer may be used for characterizing the pore size, pore volume, and surface area of the NSPG electrode material.

The pore size of the NSPG material ranges from about 0.5 nm to about 70 nm. For example, the particle size may be from about 1 nm to about 65 nm, about 5 nm to about 60 nm, 10 nm to about 65 nm, about 15 nm to about 60 nm, 20 nm to about 55 nm, about 25 nm to about 50 nm, 30 nm to about 45 nm, or about 35 nm to about 40 nm.

The pore volume of the NSPG material ranges from about 0.1 $cm^3$ to about 2 $cm^3$. For example, the pore volume may be from about 0.25 $cm^3$ to about 1.75 $cm^3$ about 0.5 $cm^3$ to about 1.5 $cm^3$, about 0.75 $cm^3$ to about 1.25 $cm^3$, or about 1.0 $cm^3$ to about 1.2 $cm^3$.

The surface area of the pores of the NSPG material ranges from about 400 $m^2/g$ to about 900 $m^2/g$. For example, the surface area may be from about 450 $m^2/g$ to about 850 $m^2/g$, about 500 $m^2/g$ to about 800 $m^2/g$, about 550 $m^2/g$ to about 750 $m^2/g$, about 600 $m^2/g$ to about 700 $m^2/g$, or about 620 $m^2/g$ to about 650 $m^2/g$.

In certain aspects, X-ray diffraction (XRD) may be used to obtain structural information, including but not limited to crystallinity and phase composition, about the NSPG material. In some embodiments, the XRD spectra of NSPG may exhibit characteristic peaks associated with its graphene-based structure. Key peaks may include a prominent peak at around $2\theta=26.5°$, corresponding to the (002) plane of graphene. Additional peaks may appear at angles that reflect the specific crystallographic orientation and lattice spacing of the NSPG material. The presence of these peaks confirms the presence of a graphitic structure and the synthesis of NSPG.

In certain aspects, Raman Spectroscopy may be used to obtain structural information and confirm the presence of graphene in the NSPG material. Raman spectroscopy is a powerful technique for the characterization of carbon materials like graphene, as it provides information about the vibrational modes of the atoms in the material. The intensity, position, and width of the Raman peaks can provide insights into the number of graphene layers, the presence of defects, and the level of doping. The Raman spectra of NSPG material may reveal characteristic peaks associated with graphene-based materials. The D band, G band, and 2D band are commonly observed in the Raman spectra of graphene. The D band (around 1350 $cm^{-1}$) corresponds to defects or disorder, the G band (around 1580 $cm^{-1}$) corresponds to in-plane vibrations of $sp^2$ carbon atoms, and the 2D band (around 2700 to around 2900 $cm^{-1}$) indicates the number of graphene layers. The intensity ratio of the D and G bands (ID/IG) provides insights into the degree of disorder or defects in the graphene structure.

X-ray Photoelectron Spectroscopy (XPS) is a surface-sensitive quantitative spectroscopic technique that measures the elemental composition, empirical formula, chemical state, and electronic state of the elements within a material. In certain aspects, XPS may be used to measure the elemental composition, chemical state, and electronic state of the NSPG material. The XPS measurements of NSPG material may provide information about its elemental composition, chemical state, and electronic state. XPS analysis may reveal the presence of carbon (C), nitrogen (N), and sulfur (S) elements in the NSPG material. The binding energies of these elements may be used to determine their chemical bonding and oxidation states. Additionally, XPS spectra may exhibit characteristic peaks corresponding to functional groups or surface contaminants, which may provide insights into the surface chemistry of NSPG material.

The elemental scan may provide a detailed breakdown of the elemental composition of the NSPG electrode surface. In some embodiments, the presence of peaks corresponding to O1s, N1s, C1s, and S2p confirms the successful incorporation of nitrogen and sulfur into the graphene structure. The relative intensities of these peaks can provide an estimate of the atomic ratios of these elements in the NSPG, which is crucial for understanding the doping level and the influence of these dopants on the electrochemical properties of the electrode. The high-resolution scans of these peaks can reveal the binding energy of the electrons, which is characteristic of the specific element and its chemical state. FIGS. 3A-3D are an C1s, N1s, O1s, and S2p XPS spectrum obtained by elemental scans from a NSPG electrode material in some embodiments of the present disclosure.

Figure 3A:
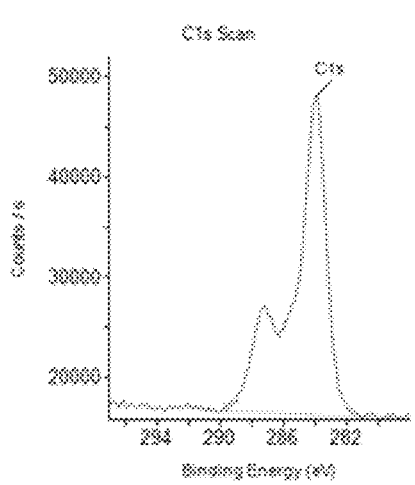
FIG. 3A is a representative high resolution C1s XPS spectrum obtained from a NSPG electrode material.
Figure 3B:
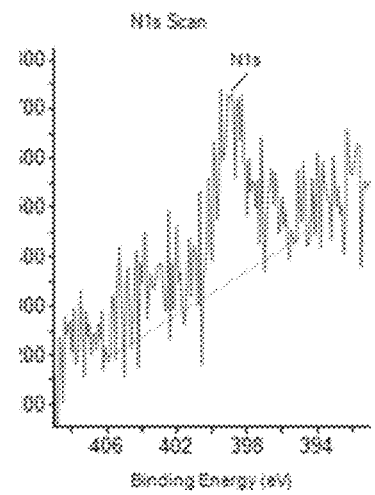
FIG. 3B is a representative high resolution N1s XPS spectrum obtained from a NSPG electrode material.
Figure 3C:
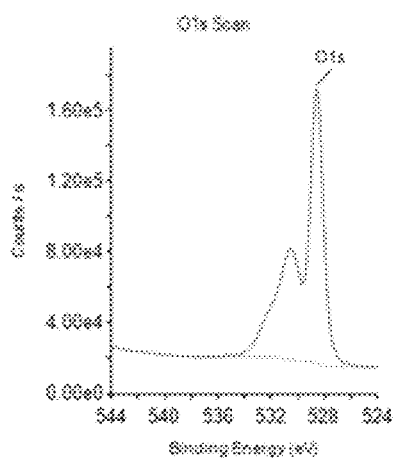
FIG. 3C is a representative high resolution O1s XPS spectrum of NSPG electrode materials disclosed herewith.
Figure 3D:
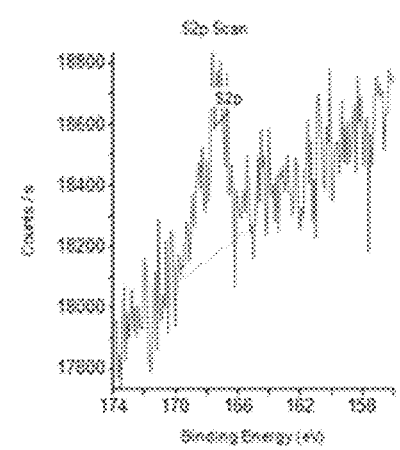
FIG. 3D is a representative high resolution S2p XPS spectrum of NSPG electrode materials disclosed herewith.
Figure 3E:
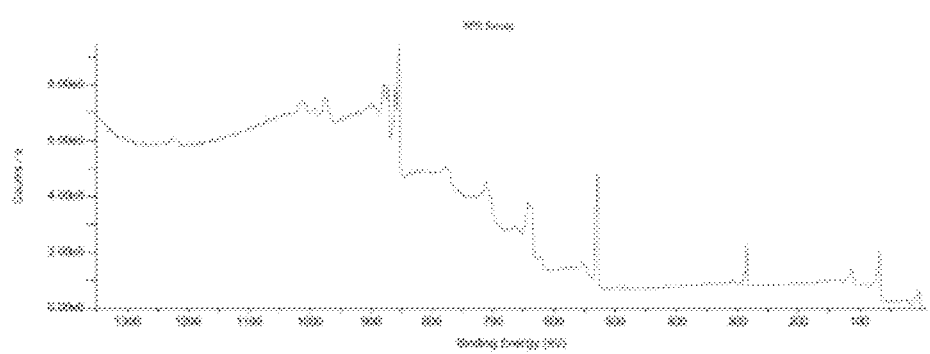
FIG. 3E is a representative XPS spectrum of NSPG electrode materials disclosed herewith.

The survey scan may provide a broad overview of all elements present on the surface of the NSPG electrode. In some embodiments, the survey scan confirms the presence of the expected elements (C, N, S, O) and can also reveal the presence of any unexpected or trace elements. The absence of peaks corresponding to impurities or unreacted precursors indicates the high purity of the NSPG electrode, which is essential for achieving optimal performance in energy storage applications. Any unexpected peaks could indicate contamination or incomplete reactions during the fabrication process, which would need to be addressed in future fabrication runs. FIG. 3E shows a survey scan of some embodiments of NSPG materials.

Figure 4:
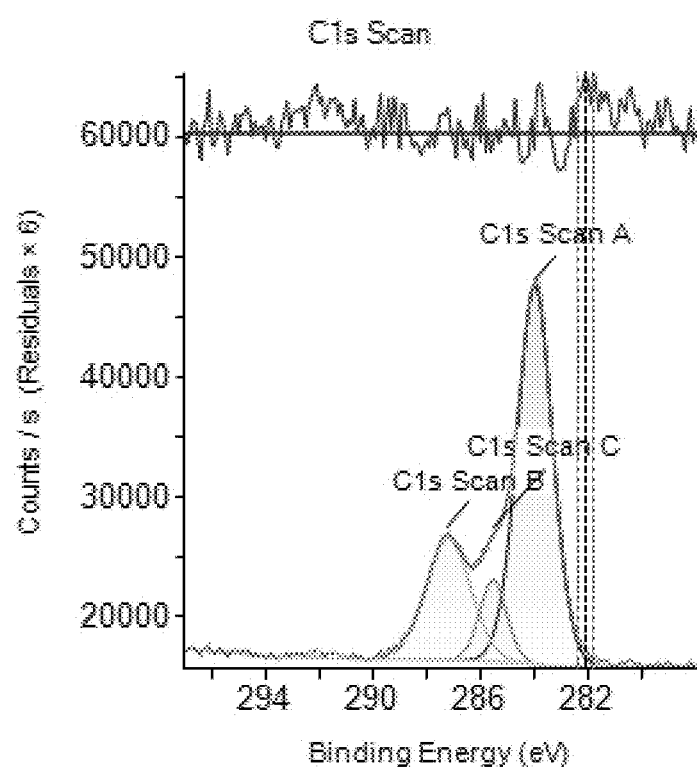
FIG. 4 is a representative XPS spectrum of NSPG electrode materials disclosed herewith.

The peak fitting scan may provide detailed information about the chemical states of the elements present. For example, the N1s peak can be deconvoluted into several components corresponding to different nitrogen functionalities (e.g., pyridinic N, pyrrolic N, graphitic N, etc.). The relative intensities of these components provide insights into the types of nitrogen doping in the NSPG. This information may be crucial as different nitrogen functionalities can have different effects on the electrochemical properties of the electrode. Similarly, the S2p peak can provide information about the types of sulfur functionalities present. The presence of different sulfur functionalities can influence the electronic structure of the graphene and hence its interaction with the electrolyte during energy storage. FIG. 4 is a representative peak fitting scan of the C1s peak in some embodiments of NSPG materials.

In certain aspects, the energy density, specific capacity, and cycling stability of the NSPG electrode material may be measured by analytical techniques including but not limited to cyclic voltammetry, galvanostatic charge/discharge cycling, and electrochemical impedance spectroscopy.

In some aspects, NSPG electrode material exhibit increased energy storage capacity, cycling stability, and charge/discharge rates, while maintaining cost-effectiveness and environmental friendliness compared to metal oxides, conducting polymers, carbon-based materials, and their composites. For example, metal oxides offer high energy density (400-1200 Wh/kg) but lower power density (10-1000 W/kg), while conducting polymers exhibit slower charging/discharging times (minutes to hours) compared to carbon-based materials (seconds to minutes). Long-term stability varies, with metal oxides retaining 80-90% capacity over 1000 cycles, conducting polymers experiencing 10-50% capacity fading over hundreds of cycles, and carbon-based materials retaining over 90% capacity over thousands of cycles. Achieving a balance between energy/power density, charging/discharging rates, and stability is a challenge in developing advanced electrode materials.

In certain aspects, the disclosed NSPG electrode materials may have an electronic conductivity ranging from about 1000 S/m to about 5000 S/m. For example, the electronic conductivity may be about to 1100 S/m to about 4900 S/m, 1200 S/m to about 4800 S/m, 1300 S/m to about 4700 S/m, 1400 S/m to about 4600 S/m, 1500 S/m to about 4500 S/m, 1600 S/m to about 4400 S/m, 1700 S/m to about 4300 S/m, 1800 S/m to about 4200 S/m, 1900 S/m to about 4100 S/m, 2000 S/m to about 4000 S/m, 2100 S/m to about 3900 S/m, 2200 S/m to about 3800 S/m, 2300 S/m to about 3700 S/m, 2400 S/m to about 3600 S/m, 2500 S/m to about 3500 S/m, 2600 S/m to about 3400 S/m, 2700 S/m to about 3300 S/m, 2800 S/m to about 3200 S/m, 2900 S/m to about 3100 S/m, or 3000 S/m to about 3050 S/m. This electronic conductivity may enable efficient electron transfer during battery operations.

In certain aspects, the disclosed NSPG electrode materials may have a capacity retention of greater than 80% over a number of charge/discharge cycles. The number of cycles may be about 800, about 850, about 900, about 950, about 1000, about 1100, about 1200, about 1300, about 1400, about 1500, about 1600, about 1700, about 1800, about 1900, about 2000, about 3000, or about 5000. The greater than 90% capacity retention reflects the materials the long-term durability. For example, the capacity retention may range from about 80% to about 99%, about 81% to about 98%, about 82% to about 97%, about 83% to about 96%, about 84% to about 95%, about 85% to about 94%, about 86% to about 93%, about 87% to about 92%, about 88% to about 91%, or about 89% to about 90% over 1000 charge/discharge cycles. In one or more embodiments, the capacity retention over 900 cycles may be greater than about 90%, about 91%, about 92%, about 93%, about 94%, about 95%, about 96%, about 97%, about 98%, or about 99%. In one or more embodiments, the capacity retention over 1000 cycles may be greater than about 90%, about 91%, about 92%, about 93%, about 94%, about 95%, about 96%, about 97%, about 98%, or about 99%. In another example, the capacity retention may range from about 90% to about 99%, about 91% to about 98%, about 92% to about 97%, about 93% to about 96%, or about 94% to about 95% over 2000 charge/discharge cycles.

In certain aspects, the disclosed NSPG electrode materials may have a specific surface area ranging from about 200 $m^2/g$ to about 2000 $m^2/g$. For example, the specific surface area may range from about 250 $m^2/g$ to about 1950 $m^2/g$, about 300 $m^2/g$ to about 1900 $m^2/g$, about 350 $m^2/g$ to about 1850 $m^2/g$, about 400 $m^2/g$ to about 1800 $m^2/g$, about 450 $m^2/g$ to about 1750 $m^2/g$, about 500 $m^2/g$ to about 1700 $m^2/g$, about 550 $m^2/g$ to about 1650 $m^2/g$, about 600 $m^2/g$ to about 1600 $m^2/g$, about 650 $m^2/g$ to about 1550 $m^2/g$, about 700 $m^2/g$ to about 1500 $m^2/g$, about 750 $m^2/g$ to about 1450 $m^2/g$, about 800 $m^2/g$ to about 1400 $m^2/g$, about 850 $m^2/g$ to about 1350 $m^2/g$, about 900 $m^2/g$ to about 1300 $m^2/g$, about 950 $m^2/g$ to about 1250 $m^2/g$, about 1000 $m^2/g$ to about 1200 $m^2/g$, about 1050 $m^2/g$ to about 1150 $m^2/g$, or about 1100 $m^2/g$ to about 1125 $m^2/g$.

In certain aspects, the disclosed NSPG electrode materials may have a capacity ranging from about 30 mAh to about 150 mAh. For example, the capacity may range from about 30 mAh to about 150 mAh, about 35 mAh to about 145 mAh, about 40 mAh to about 140 mAh, about 45 mAh to about 135 mAh, about 50 mAh to about 130 mAh, about 55 mAh to about 125 mAh, about 60 mAh to about 120 mAh, about 65 mAh to about 115 mAh, about 70 mAh to about 110 mAh, about 75 mAh to about 105 mAh, about 80 mAh to about 100 mAh, about 85 mAh to about 95 mAh, or about 87 mAh to about 92 mAh.

In certain aspects, the disclosed NSPG electrode materials may have a specific capacity ranging from about 100 mAh/g to about 500 mAh/g. For example, the specific capacity may range from about 120 mAh/g to about 480 mAh/g, about 140 mAh/g to about 460 mAh/g, about 160 mAh/g to about 440 mAh/g, about 180 mAh/g to about 420 mAh/g, about 200 mAh/g to about 400 mAh/g, about 220 mAh/g to about 380 mAh/g, about 240 mAh/g to about 360 mAh/g, about 260 mAh/g to about 340 mAh/g, about 280 mAh/g to about 320 mAh/g, or about 300 mAh/g to about 310 mAh/g. In some embodiments, the specific capacity may be from about 200 mAh/g to about 400 mAh/g.

In certain aspects, the disclosed NSPG electrode materials may have an energy density ranging from about 10 Wh/kg to about 200 Wh/kg. For example, the energy density may range from about 20 Wh/kg to about 190 Wh/kg, about 30 Wh/kg to about 180 Wh/kg, about 40 Wh/kg to about 170

Wh/kg, about 50 Wh/kg to about 160 Wh/kg, about 60 Wh/kg to about 150 Wh/kg, 70 Wh/kg to about 140 Wh/kg, about 80 Wh/kg to about 130 Wh/kg, about 90 Wh/kg to about 120 Wh/kg, or about 100 Wh/kg to about 110. In some embodiments, the energy density may be from about 10 to about 25 Wh/kg. In other embodiments, the energy density may be from about 100 to about 200 Wh/kg. The energy density may depend on factors such as the effective surface area of the electrode, the ionic conductivity of the electrolyte, and the electrochemical performance of the materials.

In certain aspects, the disclosed NSPG electrode materials may have a power density ranging from about 500 W/kg to about 10,000 W/kg. For example, the power density may range from about 600 W/kg to about 9900 W/kg, about 700 W/kg to about 9800 W/kg, about 800 W/kg to about 9700 W/kg, about 900 W/kg to about 9600 W/kg, about 1000 W/kg to about 9500 W/kg, about 1100 W/kg to about 9400 W/kg, about 1200 W/kg to about 9300 W/kg, about 1300 W/kg to about 9200 W/kg, about 1400 W/kg to about 9100 W/kg, about 1500 W/kg to about 9000 W/kg, about 1600 W/kg to about 8900 W/kg, about 1700 W/kg to about 8800 W/kg, about 1800 W/kg to about 8700 W/kg, about 1900 W/kg to about 8600 W/kg, about 2000 W/kg to about 8500 W/kg, about 2100 W/kg to about 8400 W/kg, about 2200 W/kg to about 8300 W/kg, about 2300 W/kg to about 8200 W/kg, about 2400 W/kg to about 8100 W/kg, about 2500 W/kg to about 8000 W/kg, about 2600 W/kg to about 7900 W/kg, about 2700 W/kg to about 7800 W/kg, about 2800 W/kg to about 7700 W/kg, about 2900 W/kg to about 7600 W/kg, about 3000 W/kg to about 7500 W/kg, about 3100 W/kg to about 7400 W/kg, about 3200 W/kg to about 7300 W/kg, about 3300 W/kg to about 7200 W/kg, about 3400 W/kg to about 7100 W/kg, about 3500 W/kg to about 7000 W/kg, about 3600 W/kg to about 6900 W/kg, about 3700 W/kg to about 6800 W/kg, about 3800 W/kg to about 6700 W/kg, about 3900 W/kg to about 6600 W/kg, about 4000 W/kg to about 6500 W/kg, about 4100 W/kg to about 6400 W/kg, about 4200 W/kg to about 6300 W/kg, about 4300 W/kg to about 6200 W/kg, about 4400 W/kg to about 6100 W/kg, about 4500 W/kg to about 6000 W/kg, about 4600 W/kg to about 5900 W/kg, about 4700 W/kg to about 5800 W/kg, about 4800 W/kg to about 5700 W/kg, about 4900 W/kg to about 5600 W/kg, about 5000 W/kg to about 5500 W/kg, about 5100 W/kg to about 5400 W/kg, or about 5200 W/kg to about 5300 W/kg. The power density may be influenced by the optimized pore structure and the efficient ion transport provided by the electrolyte.

In certain aspects, the disclosed NSPG electrode materials may demonstrate a rapid charging and discharging with C-rates ranging from about 10 to about 100. For example, the C-rate may be from about 20 to about 90, about 30 to about 80, about 40 to about 70, or about 50 to about 60.

Electrodes Made from NSPG Electrode Materials

An electrode is constituted by an electrode material, a conductive material, a current collector, and a binder (binding agent). An electrode is typically made by mixing an electrode material, a binder, a solvent, and optionally additives. The binder helps in adhering the electrode material to the current collector and maintaining structural integrity during battery cycling. The solvent helps to form a solution with all the components dissolved or suspended in it.

The present disclosure also includes electrodes made from the electrode materials described above. The electrodes may be anodes or cathodes. The present disclosure also includes the use of the disclosed electrodes in any one of energy storage devices, electrochemical sensors, catalytic reactions, and combinations thereof.

In some embodiments of the present disclosure, the electrode material may be any material described above. For example, the electrode material may be a doped porous graphene. In some embodiments, or nitrogen and sulfur co-doped porous graphene.

Examples of suitable binders include but are not limited to biopolymers, polyvinylidene fluoride (PVDF), polyvinyl alcohol (PVA), polyacrylic acid (PAA), or chitosan, styrene-butadiene rubber (SBR), or combinations thereof. The biopolymers include but are not limited to chitosan, alginate, cellulose derivatives, and combinations thereof. Cellulose derivates include but are not limited to carboxymethyl cellulose (CMC). Notably, chitosan is superior to alginate and cellulose derivatives as an eco-friendly binder due to its biocompatibility, strong film-forming properties, and excellent adhesion and/or cohesion. These characteristics make chitosan a preferred choice for fabricating electrodes in energy storage devices, ensuring mechanical integrity and performance.

In some embodiments, the binder may be chitosan. Chitosan is biocompatible, biodegradable, and has film-forming properties. Different grades and formulations of chitosan may vary in properties and performance. Chitosan acts as an eco-friendly alternative to the conventional petroleum-based binders such as PVDF or SBF. The chitosan may be derived from a naturally occurring polymer including a naturally occurring polymer found in the shells of crustaceans. PVDF or SBR binders provide enhanced mechanical strength, adhesion, stability, or combination thereof. Thus, a combination of binders may be desired depending on specific requirements, performance goals, and optimization needs of the cathode and subsequent energy storage device. In some embodiments, the chitosan may be derived from chitin.

In some embodiments, the solvent may be an acid, such as acetic acid. In other embodiments, the solvent may be a weak acid or an organic acid.

The electrode formed using co-doped porous graphene and the chitosan binder may be utilized in various battery configurations.

The disclosed NSPG electrodes enhanced electrochemical performance, including high energy and power density, rapid charging and discharging capabilities, and excellent cycling stability, make them appropriate for energy storage devices. These energy storage devices include but are not limited to lithium-ion batteries, sodium-ion batteries, magnesium-ion batteries, supercapacitors, or similar devices.

Lithium-ion batteries may be utilized in consumer electronics, electric vehicles, and grid energy storage. NSPG electrodes may improve the performance and safety of lithium-ion batteries. The disclosed NSPG electrode's versatility makes them compatible with emerging battery technologies, such as sodium-ion or magnesium-ion batteries, further expanding their applicability in energy storage.

The disclosed NSPG electrodes may provide increased energy storage capacity and power output for supercapacitors. Supercapacitors made from the NSPG electrodes may be used in fast-charging energy storage systems, backup power supplies, and hybrid electric vehicles.

The disclosed NSPG electrodes' high surface area, interconnected porous structure, and abundant redox active sites, make them appropriate for electrochemical sensing applications. The electrochemical sensing applications include but are not limited to any one of environmental monitoring, biomedical sensors, chemical sensors or a combination thereof. For example, the disclosed NSPG electrodes may be used to develop sensors for detecting trace amounts of pollutants, such as heavy metals, organic contaminants, or harmful gases, in air, water, or soil. In another example, the disclosed NSPG electrodes may be employed in the fabrication of sensors for detecting biomolecules or monitoring biological processes, such as glucose sensors for diabetes management or neurotransmitter sensors for neurological research. In yet another, the disclosed NSPG electrodes may be applied in the development of sensors for monitoring industrial processes, detecting hazardous chemicals, or ensuring quality control in various manufacturing sectors.

In certain aspects, the nitrogen and sulfur co-doping and porous structure of the disclosed NSPG electrodes provide an abundance of active sites that may facilitate various catalytic reactions, making them suitable for applications in electrocatalysis or heterogeneous catalysis. This may include potential uses in energy conversion devices, such as fuel cells or electrolyzers, and the production of valuable chemicals through sustainable catalytic processes.

The disclosed NSPG electrodes' shape and size may be customized using nickel foam as a template, allowing for flexibility in design. Typical dimensions range from a few square centimeters to tens of square centimeters, with thicknesses in the range of tens to hundreds of micrometers. The size and share of the disclosed NSPG electrodes may depend on the intended application.

The thickness of the disclosed NSPG electrodes depend on the intended application, the performance requirements of the electrode, and the manufacturing feasibility. The thickness of the electrode may be optimized based on the desired energy density, power output, and other factors to achieve the desired performance.

The thickness of the disclosed NSPG electrodes ranges from about 10 μm to about 900 μm. For example, the thickness may be from about 25 μm to about 875 μm, about 50 μm to about 850 μm, about 75 μm to about 825 μm, about 100 μm to about 800 μm, about 125 μm to about 775 μm, about 150 μm to about 750 μm, about 175 μm to about 725 μm, about 200 μm to about 700 μm, about 225 μm to about 675 μm, about 250 μm to about 650 μm, about 275 μm to about 625 μm, about 300 μm to about 600 μm, about 325 μm to about 575 μm, about 350 μm to about 550 μm, about 375 μm to about 525 μm, about 400 μm to about 500 μm, about 425 μm to about 475 μm, or about 450 μm to about 470 μm. In some embodiments, the thickness may be 10 μm, 50 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, or 950 μm.

The size of the disclosed NSPG electrodes ranges from about 2 cm to about 100 cm. For example, the size may be from about 5 cm to about 95 cm, about 10 cm to about 90 cm, about 15 cm to about 85 cm, about 20 cm to about 80 cm, about 25 cm to about 80 cm, about 30 cm to about 75 cm, about 35 cm to about 70 cm, about 40 cm to about 65 cm, about 45 cm to about 60 cm, or about 50 cm to about 55 cm. In some embodiments, the NSPG electrodes may be used for large-scale battery cells or supercapacitors.

In other aspects, the size of the disclosed NSPG electrodes may range from about 5 mm to about 30 mm. For example, the size may be from about 6 mm to about 29 mm, about 7 mm to about 28 mm, about 8 mm to about 27 mm, about 9 mm to about 26 mm, about 10 mm to about 25 mm, about 11 mm to about 24 mm, about 12 mm to about 23 m, about 13 mm to about 22 mm, about 14 mm to about 21 mm, about 15 mm to about 20 mm, about 16 mm to about 19 mm, or about 17 mm to about 18 mm. In some embodiments, the NSPG electrodes may be used in 2032 coin cells.

In certain aspects, the disclosed NSPG electrode may have an electronic conductivity ranging from about 1000 S/m to about 5000 S/m. For example, the electronic conductivity may be about to 1100 S/m to about 4900 S/m, 1200 S/m to about 4800 S/m, 1300 S/m to about 4700 S/m, 1400 S/m to about 4600 S/m, 1500 S/m to about 4500 S/m, 1600 S/m to about 4400 S/m, 1700 S/m to about 4300 S/m, 1800 S/m to about 4200 S/m, 1900 S/m to about 4100 S/m, 2000 S/m to about 4000 S/m, 2100 S/m to about 3900 S/m, 2200 S/m to about 3800 S/m, 2300 S/m to about 3700 S/m, 2400 S/m to about 3600 S/m, 2500 S/m to about 3500 S/m, 2600 S/m to about 3400 S/m, 2700 S/m to about 3300 S/m, 2800 S/m to about 3200 S/m, 2900 S/m to about 3100 S/m, or 3000 S/m to about 3050 S/m. This electronic conductivity may enable efficient electron transfer during battery operations.

In certain aspects, the disclosed NSPG electrode materials may have a capacity retention of greater than 80% over a number of charge/discharge cycles. The number of cycles may be about 800, about 850, about 900, about 950, about 1000, about 1100, about 1200, about 1300, about 1400, about 1500, about 1600, about 1700, about 1800, about 1900, about 2000, about 3000, or about 5000. The greater than 90% capacity retention reflects the materials the long-term durability. For example, the capacity retention may range from about 80% to about 99%, about 81% to about 98%, about 82% to about 97%, about 83% to about 96%, about 84% to about 95%, about 85% to about 94%, about 86% to about 93%, about 87% to about 92%, about 88% to about 91%, or about 89% to about 90% over 1000 charge/discharge cycles. In one or more embodiments, the capacity retention over 900 cycles may be greater than about 90%, about 91%, about 92%, about 93%, about 94%, about 95%, about 96%, about 97%, about 98%, or about 99%. In one or more embodiments, the capacity retention over 1000 cycles may be greater than about 90%, about 91%, about 92%, about 93%, about 94%, about 95%, about 96%, about 97%, about 98%, or about 99%. In another example, the capacity retention may range from about 90% to about 99%, about 91% to about 98%, about 92% to about 97%, about 93% to about 96%, or about 94% to about 95% over 2000 charge/discharge cycles.

In certain aspects, the disclosed NSPG electrodes may have a specific surface area ranging from about 200 m$^2$/g to about 2000 m$^2$/g. For example, the specific surface area may range from about 250 m$^2$/g to about 1950 m$^2$/g, about 300 m$^2$/g to about 1900 m$^2$/g, about 350 m$^2$/g to about 1850 m$^2$/g, about 400 m$^2$/g to about 1800 m$^2$/g, about 450 m$^2$/g to about 1750 m$^2$/g, about 500 m$^2$/g to about 1700 m$^2$/g, about 550 m$^2$/g to about 1650 m$^2$/g, about 600 m$^2$/g to about 1600 m$^2$/g, about 650 m$^2$/g to about 1550 m$^2$/g, about 700 m$^2$/g to about 1500 m$^2$/g, about 750 m$^2$/g to about 1450 m$^2$/g, about 800 m$^2$/g to about 1400 m$^2$/g, about 850 m$^2$/g to about 1350 m$^2$/g, about 900 m$^2$/g to about 1300 m$^2$/g, about 950 m$^2$/g to about 1250 m$^2$/g, about 1000 m$^2$/g to about 1200 m$^2$/g, about 1050 m$^2$/g to about 1150 m$^2$/g, or about 1100 m$^2$/g to about 1125 m$^2$/g.

In certain aspects, the disclosed NSPG electrode materials may have a capacity ranging from about 30 mAh to about 150 mAh. For example, the capacity may range from about 30 mAh to about 150 mAh, about 35 mAh to about 145 mAh, about 40 mAh to about 140 mAh, about 45 mAh to about 135 mAh, about 50 mAh to about 130 mAh, about 55 mAh to about 125 mAh, about 60 mAh to about 120 mAh, about 65 mAh to about 115 mAh, about 70 mAh to about 110 mAh, about 75 mAh to about 105 mAh, about 80 mAh to about 100 mAh, about 85 mAh to about 95 mAh, or about 87 mAh to about 92 mAh.

In certain aspects, the disclosed NSPG electrode materials may have a specific capacity ranging from about 100 mAh/g to about 500 mAh/g. For example, the specific capacity may range from about 120 mAh/g to about 480 mAh/g, about 140 mAh/g to about 460 mAh/g, about 160 mAh/g to about 440 mAh/g, about 180 mAh/g to about 420 mAh/g, about 200 mAh/g to about 400 mAh/g, about 220 mAh/g to about 380 mAh/g, about 240 mAh/g to about 360 mAh/g, about 260 mAh/g to about 340 mAh/g, about 280 mAh/g to about 320 mAh/g, or about 300 mAh/g to about 310 mAh/g. In some embodiments, the specific capacity may be from about 200 mAh/g to about 400 mAh/g.

In certain aspects, the disclosed NSPG electrode materials may have an energy density ranging from about 10 Wh/kg to about 200 Wh/kg. For example, the energy density may range from about 20 Wh/kg to about 190 Wh/kg, about 30 Wh/kg to about 180 Wh/kg, about 40 Wh/kg to about 170 Wh/kg, about 50 Wh/kg to about 160 Wh/kg, about 60 Wh/kg to about 150 Wh/kg, 70 Wh/kg to about 140 Wh/kg, about 80 Wh/kg to about 130 Wh/kg, about 90 Wh/kg to about 120 Wh/kg, or about 100 Wh/kg to about 110. In some embodiments, the energy density may be from about 10 to about 25 Wh/kg. In other embodiments, the energy density may be from about 100 to about 200 Wh/kg. The energy density may depend on factors such as the effective surface area of the electrode, the ionic conductivity of the electrolyte, and the electrochemical performance of the materials.

In certain aspects, the disclosed NSPG electrode materials may have a power density ranging from about 500 W/kg to about 10,000 W/kg. For example, the power density may range from about 600 W/kg to about 9900 W/kg, about 700 W/kg to about 9800 W/kg, about 800 W/kg to about 9700 W/kg, about 900 W/kg to about 9600 W/kg, about 1000 W/kg to about 9500 W/kg, about 1100 W/kg to about 9400 W/kg, about 1200 W/kg to about 9300 W/kg, about 1300 W/kg to about 9200 W/kg, about 1400 W/kg to about 9100 W/kg, about 1500 W/kg to about 9000 W/kg, about 1600 W/kg to about 8900 W/kg, about 1700 W/kg to about 8800 W/kg, about 1800 W/kg to about 8700 W/kg, about 1900 W/kg to about 8600 W/kg, about 2000 W/kg to about 8500 W/kg, about 2100 W/kg to about 8400 W/kg, about 2200 W/kg to about 8300 W/kg, about 2300 W/kg to about 8200 W/kg, about 2400 W/kg to about 8100 W/kg, about 2500 W/kg to about 8000 W/kg, about 2600 W/kg to about 7900 W/kg, about 2700 W/kg to about 7800 W/kg, about 2800 W/kg to about 7700 W/kg, about 2900 W/kg to about 7600 W/kg, about 3000 W/kg to about 7500 W/kg, about 3100 W/kg to about 7400 W/kg, about 3200 W/kg to about 7300 W/kg, about 3300 W/kg to about 7200 W/kg, about 3400 W/kg to about 7100 W/kg, about 3500 W/kg to about 7000 W/kg, about 3600 W/kg to about 6900 W/kg, about 3700 W/kg to about 6800 W/kg, about 3800 W/kg to about 6700 W/kg, about 3900 W/kg to about 6600 W/kg, about 4000 W/kg to about 6500 W/kg, about 4100 W/kg to about 6400 W/kg, about 4200 W/kg to about 6300 W/kg, about 4300 W/kg to about 6200 W/kg, about 4400 W/kg to about 6100 W/kg, about 4500 W/kg to about 6000 W/kg, about 4600 W/kg to about 5900 W/kg, about 4700 W/kg to about 5800 W/kg, about 4800 W/kg to about 5700 W/kg, about 4900 W/kg to about 5600 W/kg, about 5000 W/kg to about 5500 W/kg, about 5100 W/kg to about 5400 W/kg, or about 5200 W/kg to about 5300 W/kg. The power density may be influenced by the optimized pore structure and the efficient ion transport provided by the electrolyte.

In certain aspects, the disclosed NSPGs may demonstrate a rapid charging and discharging with C-rates ranging from about 10 to about 100. For example, the C-rate may be from about 20 to about 90, about 30 to about 80, about 40 to about 70, or about 50 to about 60.

In some aspects, the disclosed NSPG electrodes may be used in coin cells. The coulombic efficiency of the coin cell may be relatively high, ranging from about 95% to about 99%. For example, the coulombic efficiency may be about 98%, about 96%, about 97% about 98% or about 99%. This is attributable to the optimized pore structure, efficient ion transport, and the strong electrochemical interactions between the electrode materials and the electrolyte.

In some aspects, the coin cell battery may operate in a voltage range from about 2.0 V to about 5.0 V, about 2.5 V to about 5.0 V, about 2.0 V to about 4.2 V, or about 2.5 V to about 4.2 V. For example, the voltage range may be about 2.1 V to about 4.9 V, about 2.2 V to about 4.8 V, about 2.3 V to about 4.7 V, about 2.4 V to about 4.6 V, about 2.5 V to about 4.5 V, about 2.6 V to about 4.4 V, about 2.7 V to about 4.3 V, about 2.8 V to about 4.2 V, 2.9 V to about 4.1 V, about 3.0 V to about 3.9 V, about 3.1 V to about 3.8 V, about 3.2 V to about 3.7 V, or about 3.3 V to about 3.6 V, or about 3.4 V to about 3.5 V. In some embodiments, the voltage may be from 2.5 V to 4.2 V.

Notably, the voltage of the disclosed coin cell battery may be higher than 3.6 V lithium-ion coin cell batteries. In some embodiments, the voltage may be ≥4.3 V, ≥4.2 V, ≥4.1 V, ≥4.0 V, ≥3.9 V, ≥3.8 V, or ≥3.7 V.

In some aspects, the disclosed coin cell battery may have a 60-170% increase in energy density compared to 3.6 V lithium-ion coin cell batteries. For example, the increase in energy density range from about 60% to about 170%, about 65% to about 165%, about 70% to about 160%, about 75% to about 155%, about 80% to about 150%, about 85% to about 145%, about 90% to about 140%, about 95% to about 135%, about 100% to about 130%, about 105% to about 125%, about 110% to about 120%, or about 112% to about 115%.

In some aspects, the disclosed coin cell battery may have a capacity ranging from about 30 mAh to about 90 mAh. For example, the capacity may range from about 35 mAh to about 85 mAh, about 40 mAh to about 80 mAh, or about 45 mAh to about 75 mAh, about 50 mAh to about 70 mAh, or about 55 mAh to about 65 mAh.

Methods of Making Doped Porous Graphene Material

The present disclosure also includes methods of making doped porous graphene electrodes. The method includes a metal foam template. The metal foam serves as a hard template, providing a structure for a hydrogel to form upon. The metal foam template is later removed through an etching process, leaving behind the doped porous graphene electrode material. In some aspects, the electrode material is co-doped nitrogen and sulfur porous graphene.

The electrodes may be made by dip coating. The process may start with preparing a slurry or ink that includes the electrode material, a binder, and a solvent. A clean substrate, typically a metal foil, may then be dipped into the slurry. Upon withdrawing the substrate, the speed may affect the thickness and uniformity of the coating. Slow withdrawal may lead to thicker coatings, and faster withdrawal may result in thinner ones. After this, the substrate may be left to dry, allowing the solvent to evaporate and leave a thin film of the active material and binder on the substrate. The electrode may undergo post-treatments like annealing or calendaring to improve its properties. Finally, the coated substrate may be cut into desired shapes and sizes. While simple and controllable, dip coating might not suit all electrode materials and may be slower and less scalable than other methods.

FIG. 1 shows a method of making doped porous graphene electrode materials. The method 100 includes dispersing graphene oxide in a solvent 102 and ultrasonicating the graphene oxide and the solvent for a first specified time forming a first solution 104; dissolving a binder in an acid solution forming a second solution 106; mixing and heating the second solution to a first temperature for a second specified time; adding a dopant source into the second solution forming a third solution 108; mixing the third solution; adding the first solution into the third solution forming a fourth solution 110; mixing the fourth solution for a third specified time; cutting metal foam into specified shapes and sizes forming a cut metal foam 112; dipping the cut metal template into the fourth solution forming a uniformly coated metal foam 114; adding a cross-linking agent to the uniformly coated metal template to cross-link the nitrogen dopant forming a hydrogel-coated metal foam 116; treating the hydrogel-coated metal foam with liquid nitrogen and freeze-drying at a second temperature and a first pressure forming a freeze-dried hydrogel-coated metal foam 118; carbonizing the freeze-dried hydrogel-coated metal foam 120; dissolving the metal foam template in an etchant forming the electrode material 122; washing the electrode material with ultrapure water 124; and drying the electrode material to obtain dried electrode material 124.

Referring to step 102 in FIG. 1, the method 100 of making doped porous graphene includes preparing a solution of graphene oxide in water (solution 1). The water may be deionized water. In some embodiments, the graphene oxide used has an average molecular weight ranging from about 10,000 g/mol to about 30,000 g/mol. For example, the molecular weight may range from about 11,000 g/mol to about 29,000 g/mol, from about 12,000 g/mol to about 28,000 g/mol, from about 13,000 g/mol to about 27,000 g/mol, from about 14,000 g/mol to about 26,000 g/mol, from about 15,000 g/mol to about 25,000 g/mol, from about 16,000 g/mol to about 24,000 g/mol, from about 17,000 g/mol to about 23,000 g/mol, from about 18,000 g/mol to about 22,000 g/mol, or from about 19,000 to about 21,000 g/mol. In one embodiment, the average molar mass of the graphene oxide may be about 12,000 g/mol. The molar mass of graphene oxide may vary depending on the synthesis method and degree of oxidation. The next step of the method involves ultrasonicating the solution of graphene oxide in water for a first specified time 104. The first specified time under ultrasonication may range from about 1 hour to about 4 hours. For example, the time may range from about 1.2 hours to about 3.8 hours, about 1.4 hours to about 3.6 hours, about 1.6 hours to about 3.4 hours, about 1.8 hours to about 3.2 hours, about 2.0 hours to about 3.0 hours, about 2.2 hours to about 2.8 hours, or about 2.4 hours to about 2.6 hours. In one embodiment, the first specified time may be 2 hours.

Referring to step 106 in FIG. 1, concurrently, the method includes forming a solution of a binder in an acidic solution (solution 2) at first temperature for a second specified time. The first temperature ranges from about 40° C. to about 60° C. For example, the temperature may be from about 41° C. to about 59° C., about 42° C. to about 58° C., about 43° C. to about 57° C., about 44° C. to about 56° C., about 45° C. to about 55° C., about 46° C. to about 54° C., about 47° C. to about 53° C., about 48° C. to about 52° C., about 49° C. to about 53° C., or about 50° C. to about 52° C. In one embodiment, the temperature may be 45° C.

The second specified time may range from about 0.5 hour to about 2 hours. For example, the time may range from about 0.6 hours to about 1.9 hours, about 0.7 hours to about 1.8 hours, about 0.8 hours to about 1.7 hours, about 0.9 hours to about 1.6 hours, about 1.0 hours to about 1.5 hours, about 1.1 hours to about 1.4 hours, or about 1.2 hours to about 1.2 hours. This duration may allow sufficient time for the binder to completely dissolve, ensure a uniform distribution of the binder, and for the mixture to become homogeneous and transparent.

The acidic solution may be about 1 vol % to about 10 vol %, about 2 vol % to about 9 vol %, about 3 vol % to about 8 vol %, about 4 vol % to about 7 vol %, or about 5 vol % to about 6 vol %. In one embodiment, the acidic solution may be 2 vol %.

Suitable binders include but are not limited to biopolymers, polyvinyl alcohol (PVA), poly(vinylidene fluoride) (PVDF), and carboxymethyl cellulose (CMC). The binder choice depends on the desired compatibility, adhesion, film-forming, and stability considerations of the resulting electrode material and electrode. In one embodiment, the binder is chitosan, a biopolymer derived from chitin. The molar mass of chitosan may vary depending on the degree of deacetylation and the specific source of chitosan. The molecular weight of the chitosan may range from about 300,000 g/mol to about 500,000 g/mol. For example, the molecular weight may be from about 350,000 g/mol to about 450,000 g/mol or about 400,000 g/mol to about 425,000 g/mol. In one embodiment, the molecular weight of the chitosan may be 400,000 g/mol.

Suitable acids to form the acidic solution include but are not limited to any one of acetic acid, formic acid, hydrochloric acid, citric acid, or combinations thereof. These acids possess the ability to solubilize binders effectively, allowing for the formation of a homogenous binder solution. The selection of the specific acid should consider factors such as compatibility with the experimental conditions, desired pH, and potential impact on the overall synthesis process. In one embodiment, the acidic solution is a solution of acetic acid. In another embodiment, the acidic solution is a 2 vol % acetic acid solution.

The pH of the binder solution ranges from about 4 to about 6. This range ensures a mildly acidic environment, which is favorable for the dissolution and homogenous blending of binders such as chitosan. For example, the pH may be from about 4.1 to about 5.9, about 4.2 to about 5.8, about 4.3 to about 5.7, about 4.4 to about 5.6, about 4.5 to about 5.5, about 4.6 to about 5.4, about 4.7 to about 5.3, about 4.8 to about 5.2, or about 4.9 to about 5.1.

Referring to step 108 in FIG. 1, dopants may be added to the binder solution. After the addition of the dopant, the solution may be mixed thoroughly to form a binder-dopant-mixture (solution 3). Dopants in 108 are elements or compounds that may modify the electrochemical property of graphene. For example, dopants include but as not limited to compounds containing nitrogen, sulfur, boron, phosphorous, or transition metals such as iron. Examples of suitable dopants include thiourea, thioacetamide, sodium sulfide, urea, melamine, or combinations thereof. The specific choice of dopants depends on the desired properties and performance requirements of the doped porous graphene electrode material. In one embodiment, the dopant may be thiourea. Thiourea may serve as a cost-effective source for nitrogen and sulfur dopants compared to other doping agents.

Referring to step 110 in FIG. 1, the graphene oxide solution may be added to the binder-dopant-mixture and stirred for third specified time to form a graphene oxide-binder-dopant solution (solution 5). The third specified time may range from about 0.5 hour to about 4 hours. For example, the time may be about 0.5 hours to about 3.5 hours, about 1 hours to about 3 hours, about 1.5 hours to about 2.5 hours, or about 1 hour to about 2 hours. In one embodiment, the time is 2 hours.

Referring to step 112 in FIG. 1, metal foam may be cut into desired shapes and sizes. Metal foams are porous metallic substrates. Suitable metal foams include not are not limited to any one of nickel foam, copper foam, aluminum foam, or titanium foam. The choice of the metal foam depends on factors such as electrical conductivity, mechanical strength, corrosion resistance, and compatibility with the doped porous electrode material. In one embodiment, the metal foam is nickel foam. The use of nickel foam as a hard template ensures that the doped porous graphene electrode material conforms to the desired shape and size, while also imparting a porous and interconnected structure.

In some aspects, common shapes for metal foam include sheets, discs, cylinders, or custom geometries based on the specific needs of the experiment or device. The sizes may vary depending on the application, ranging from a few centimeters to larger dimensions. The exact desired shapes and sizes of the cut metal foam depends on the specific use.

Referring to step 114 in FIG. 1, the cut metal foam may be dipped into graphene oxide-binder-dopant solution to form a coated metal foam 114. The process of dipping the metal foam into the graphene oxide-binder-dopant solution may involve submerging the foam into the solution to ensure a uniform coating on its surface. The exact dipping technique may vary depending on the device requirements. In some aspects, tweezers or other tools may be used to hold the metal foam piece and immerse it fully in the graphene oxide-binder-dopant solution. After dipping, any excess solution may be removed by gently shaking or tapping the foam to ensure an even coating without excess liquid. The dipping process may achieve uniform coverage of the metal foam surface with the graphene oxide-binder-dopant. The dipping method allows for a more uniform and controllable deposition of the hydrogel on the metal foam template, because the dipping process may be easily controlled to achieve a uniform coating of the hydrogel on the metal foam template. This uniformity may be crucial for the performance of the final product, as it may ensure that hydrogels are evenly distributed across the template, leading to a more efficient and effective energy storage device. In one embodiment, the dipping process results in the formation of chitosan-coated graphene oxide mixture on a nickel foam.

Referring to step 116 in FIG. 1, a cross-linking agent may be added to the metal foam surface with the graphene oxide-binder-dopant to form a hydrogel-coated metal form. Cross-linking agents may be aldehyde containing compounds. Examples of suitable aldehydes include but are not limited to glutaraldehyde, formaldehyde, glyoxal, or similar compounds. These aldehydes may provide cross-linking functionality to the graphene oxide-binder-dopant solution, facilitating the formation of a hydrogel on the metal foam surface. The specific choice of alternative aldehyde may depend on factors such as desired cross-linking efficiency, compatibility with the other components, and the intended application of the doped porous graphene electrode.

In some embodiments, the cross-linking agent is glutaraldehyde. Glutaraldehyde acts as a cross-linking agent by forming covalent bonds between binder molecules, creating a stable hydrogel on the metal foam template. Other suitable cross-linking agents include formaldehyde (methanal) and glyoxal, which may also facilitate cross-linking reactions with binders. In some embodiments, the dopant is thiourea. In some embodiments, the binder is chitosan. Glutaraldehyde is a cross-linking agent that may react with chitosan to form a stable hydrogel on the metal foam template. In other embodiments, the hydrogel-coated metal foam is a hydrogel-coated nickel foam. The use of chitosan, a biopolymer, as a binder and hydrogel former, combined with thiourea as the source of nitrogen and sulfur dopants, results in an environmentally friendly and cost-effective approach to fabricating nitrogen and sulfur doped porous graphene electrodes.

Referring to step 118 in FIG. 1, the hydrogel-coated metal foam may be freeze dried in a freeze dryer by treating with liquid nitrogen at second temperature and first pressure. A freeze dryer may remove water in solid phase from hydrogel-coated metal foam by sublimation. It may be important to follow the specified process of removing solid phase water from the hydrogel-coated metal foam through freeze-drying. The process of freeze-drying involves sublimation, which is the transition of a substance from the solid phase directly to the gas phase without passing through the liquid phase. Water in the disclosed hydrogel-coated metal foams undergoes sublimation during freeze-drying, where it transforms from solid ice to water vapor without transitioning to the liquid state. This sublimation process helps preserve the porous structure of the hydrogel and maintain the desired porosity of the doped porous graphene electrode. Alternative methods of water removal, such as evaporation or thermal drying, may result in collapsed or distorted porous structures, leading to compromised performance of the doped porous graphene electrode. Therefore, adhering to the freeze-drying process is crucial to maintain the desired porosity and structural integrity of the electrode.

The second temperature ranges from about −60° C. to about −30° C. For example, the temperature may range from about −58° C. to about −32° C., −56° C. to about −34° C., −54° C. to about −36° C., −52° C. to about −38° C., −50° C. to about −40° C., −48° C. to about −42° C., or −46° C. to about −44° C. In one embodiment, the freeze dry temperature is −50° C. The specified temperature of −50° C. during freeze-drying is essential. Deviating from this temperature range may impact the successful sublimation of water from the hydrogel-coated metal foam. A lower temperature may result in incomplete water removal, while a higher temperature may lead to excessive drying or even melting, compromising the desired porous structure. Thus, maintaining the specified temperature of about −50° C. ensures the proper sublimation of water and preserves the integrity of the doped porous graphene electrodes' porosity.

The first pressure may be from about 1 Pa to about 15 Pa. For example, the pressure may be from about 2 Pa to about 14 Pa, about 2 Pa to about 13 Pa, about 3 Pa to about 12 Pa, about 4 Pa to about 11 Pa, about 5 Pa to about 10 Pa, about 6 Pa to about 9 Pa, or about 7 Pa to about 8 Pa. In one embodiment, the pressure may be 10 Pa. The pressure in freeze-drying may play a crucial role in the sublimation process. A lower pressure could result in inadequate water removal, while a higher pressure may impede the sublimation process or cause undesired effects on the hydrogel structure. Adhering to the specified pressure of about 10 Pa ensures optimal conditions for sublimation, maintaining the integrity of the porous structure and preserving the desired properties of the doped porous graphene electrode.

Referring to step 120 in FIG. 1, the freeze-dried hydrogel coated metal foam may be carbonized in a furnace to form graphene from graphene oxide. The carbonizing step involves heating the freeze-dried hydrogel coated metal foam in an inert atmosphere at a suitable temperature for a specified time. The furnace may be heated at a ramp rate ranging from about 2° C./min to about 7° C./min. For example, the ramp rate may be from about 2.5° C./min to about 6.5° C./min, about 3° C./min to about 6° C./min, about 3.5° C./min to about 5.5° C./min, about 4° C./min to about 5° C./min, or about 4.5° C./min to about 4.7° C./min. In one embodiment, the ramp rate may be 5° C./min. The suitable temperature ranges from about 750° C. to about 850° C. For example, the temperature may be from about 760° C. to about 840° C., about 750° C. to about 830° C., about 760° C. to about 820° C., about 770° C. to about 810° C., about 780° C. to about 800° C., or about 790° C. to about 795° C. In one embodiment, the temperature may be 800° C. The time ranges from about 1.5 hours to about 4 hours. For example, the time may be 2 hours to about 3.5 hours, 2.5 hours to about 3 hours, or about 2.7 hours to about 2.9 hours. In one embodiment, the time may be 2 hours. In some aspects, the inert atmosphere is an atmosphere of any one of nitrogen, helium, argon, or combinations thereof. In one embodiment, the inert atmosphere may be nitrogen.

Referring to step 122 in FIG. 1, the metal template may be dissolved in a suitable etchant at an appropriate concentration and temperature to remove the metal template from the electrode material. Examples of suitable etchants include but are not limited to any one of aqua regia, nitric acid, hydrochloric acid, sulfuric acid, or combinations thereof. Nitric acid and sulfuric acid may be used at a concentration ranging from about 10 vol % to about 50 vol %. Hydrochloric acid may be used at a concentration ranging from about 10 vol % to about 40 vol %. The choice of etchant depends on factors such as etching rate, selectivity, safety, and compatibility with the doped porous graphene material. The appropriate temperature ranges from room temperature to moderately elevated of about 50° C. For example, the temperature may range from about 25° C. to about 45° C., about 30° C. to about 40° C., or about 35° C. to about 38° C. Specific concentrations and temperatures should be determined based on optimization and safety considerations.

Referring to step 124 in FIG. 1, the last step of the method includes washing the electrode material with a solvent followed by drying the electrode material in an oven at a suitable temperature for a suitable time. may be to recover the electrode material by washing. Examples of solvents that may be used for the washing step include but are not limited to water, ethanol, acetone, or combinations thereof. In one embodiment, deionized water may be used in the washing step. Water is commonly used to wash the obtained doped porous graphene electrode material due to its ability to remove residual impurities and ensure cleanliness. The choice of solvent depends on the solubility of impurities and compatibility with the doped porous graphene electrode material.

After washing, doped porous graphene electrode materials may be dried in an oven at a temperature ranging from about 70° C. to about 90° C. to obtain the doped porous graphene electrode material. For example, the temperature may be about 75° C. to about 85° C., or about 80° C. to about 83° C. In one embodiment, the temperature is 80° C. In some embodiments, the doped porous graphene is nitrogen and sulfur porous graphene electrode material.

In some aspects, the purity of the doped porous graphene is greater than 90%. The purity may be greater than about 91%, about 92%, about 93%, about 94%, about 95%, about 96%, about 97%, about 98%, or about 99%. In one embodiment, the purity is greater than 95%.

In some aspects, the final liquid content in the doped porous graphene may be less than 1 wt %. The final liquid content may be less than 0.9 wt %, less than 0.8 wt %, less than 0.7 wt %, less than 0.6 wt %, less than 0.5 wt %, less than 0.4 wt %, less than 0.3 wt %, less than 0.2 wt %, or less than 0.1 wt %. In some embodiments, the liquid may be one of more of deionized water, 2 vol % acetic acid, or glutaraldehyde.

In certain aspects, the final particle size of the doped porous graphene electrode material ranges from about 5 nm to about 50 nm. For example, the particle size may be about 10 nm to about 45 nm, about 15 nm to about 40 nm, about 20 nm to about 35 nm, or about 25 nm to about 30 nm.

In some aspects, use of chitosan, a biopolymer derived from chitin, as a binder and hydrogel former is more environmentally friendly compared to the use of toxic binders and solvents in conventional electrode fabrication. Additionally, thiourea may serve as a cost-effective source for nitrogen and sulfur dopants compared to other doping agents.

In certain aspects, nitrogen and sulfur co-doping of the porous graphene material results in enhanced electrical conductivity, increased active site density, and modulated electronic structure, all contributing to improved electrochemical performance. This advantage may be demonstrated by the NSPG electrode's high energy and power density, rapid charging and discharging capabilities, and excellent electrochemical stability.

In some aspects, the freeze-drying and carbonization process employed in the synthesis of NSPG material may create a highly porous structure with interconnected pores. This porous architecture facilitates efficient ion diffusion and charge transport, which is critical for high-performance energy storage devices and electrochemical sensors.

In some aspects, the disclosed fabrication method may be adapted for various applications, such as lithium-ion batteries, supercapacitors, and electrochemical sensors. The process may be optimized and customized depending on the desired application, offering greater flexibility in electrode design and performance.

In other aspects, use of metal foam as a hard template not only ensures that the NSPG material conforms to the desired shape and size but also imparts a porous and interconnected structure. This template-assisted approach allows for better control over the final electrode's morphology, which may be crucial for achieving optimal electrochemical performance.

The disclosed NSPG electrode fabrication method offers advancements over current technologies in terms of environmental friendliness, cost-effectiveness, improved electrochemical performance, versatility, and adaptability. These advantages make the NSPG electrode an attractive option for a wide range of applications in energy storage, conversion, and sensing technologies.

The performance metrics described above indicate that the disclosed method of simultaneous synthesis and shaping of NSPGs on metal-foam template may result in higher electrochemical performance compared to an electrode that is shaped after the synthesis of the material. The uniform coating, structural integrity, and efficient use of materials provided by the disclosed method contribute to these enhanced performance metrics.

Definitions

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL." The endpoint may also be based on the variability allowed by an appropriate regulatory body, such as the UL, CTIA Authorized Testing Laboratory, etc.

As used herein, "comprises," "comprising," "containing," and "having" and the like may have the meaning ascribed to them in U.S. Patent Law and may mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open-ended term, like "comprising" or "including," it is understood that direct support should be afforded also to "consisting essentially of" language as well as "consisting of" language as if stated explicitly and vice versa.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeably without departing from the teaching of the embodiments and variations herein.

As used herein, the terms "compound" and "component" are used to refer to any type of material, without any loss of generality of the material in question. That is, compound may refer to any element, ion, molecule, complex structure(s), or combinations thereof (e.g. metal oxides, metal sulfides).

As used herein, capacity (mAh) is the total amount of electric charge a battery can store and deliver under specified conditions. It is measured in milliampere-hours (mAh) and represents the product of current (in mA) and time (in hrs) during which the battery can supply that current.

As used herein, Coulombic efficiency (%) is the ratio of the total charge extracted from a battery during discharge to the total charge put into the battery during charge, expressed as a percentage. It indicates the efficiency of the battery in storing and delivering charge.

As used herein, capacity retention (%) is the measure of a battery's ability to retain its original capacity over time and repeated charge/discharge cycles. It is expressed as a percentage of the initial capacity that remains after a certain number of cycles.

As used herein, RCap_Chg (mAh/g) represents the specific charge capacity of the battery during the charging process. It is a measure of the amount of charge a battery can store per unit mass of the active material.

As used herein, RCap_DChg (mAh/g) represents the specific discharge capacity of the battery during the charging process. It indicates the amount of charge the battery can deliver per unit mass of the active material during the discharge process.

As used herein, CC_Chg_Rat (%) is the charge rate under constant current conditions. It indicates the percentage of the nominal capacity that is being charged per hour.

As used herein, REngy_Chg (mWh/g) is the specific energy charged into the battery. It measures the energy stored in the battery per unit mass of the active material during the charging process.

As used herein, State of Health (SoH) (%) is a measure of the overall condition and performance capability of a battery compared to its initial state when it was new. It is expressed as a percentage and indicates how much of the battery's original capacity and performance remain after a period of use or a certain number of cycles. SoH takes into account factors such as capacity fade, internal resistance increase, and other aging effects.

As used herein, cycle ID is the number of complete charge-discharge cycles that have been performed on the battery. A single cycle typically includes on charge phase followed by one discharge phase.

As used herein, step ID refers to the specific phase within a cycle that is being executed. Each step within a cycle is associated with a particular action or condition, such as charging at a constant current, resting, discharging at constant current, etc.

As a person skilled in the art will recognize from the previous detailed description and from the figures and claims, modifications and changes may be made to the embodiments of the invention without departing from the scope of this invention as defined in the following claims.

EXAMPLES

The following examples illustrate various non-limiting embodiments of the present disclosure.

Example 1: Fabrication of Nitrogen and Sulfur Porous Graphene (NSPG) Electrode Material 1 g of graphene oxide was dissolved in 500 mL of deionized water. The graphene oxide and water solution ultrasonicated for 2 hours. 0.4 g of chitosan was dissolved in 40 mL of 2 vol % acetic acid solution. The chitosan-acetic acid solution was heated to 45° C. in a water bath and stirred. 0.03 g of thiourea was added to the chitosan-acetic acid solution and the solution was mixed thoroughly. The graphene oxide solution was added to the chitosan-thiourea-acetic acid solution.

Figure 2A:
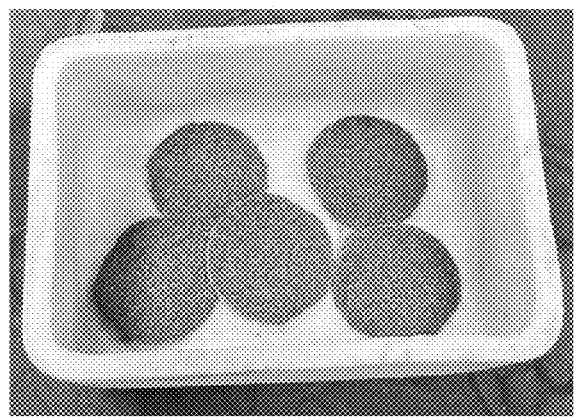
FIG. 2A is a representative pictorial image of electrode materials pre-carbonization in some embodiment.
Figure 2B:
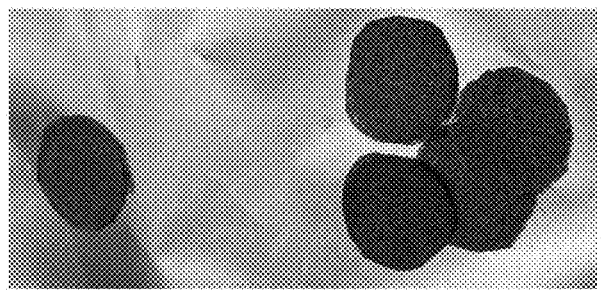
FIG. 2B is a representative pictorial image of electrode materials post-carbonization in some embodiment.

Nickel foam was cut into desired shapes and sizes. The nickel form pieces were immersed into the chitosan-thiourea-graphene oxide mixture to form a coated nickel and excess mixture was removed. 400 µL of glutaraldehyde was added to the coated nickel foam to cross-link the chitosan and form a hydrogel-coated nickel. The hydrogen-coated nickel was treated with liquid nitrogen and freeze dried at −50° C. under 10 Pa. The freeze-dried hydrogel-coated nickel foam was carbonized in a tube furnace under a nitrogen atmosphere at 800° C. for 2 hours with a ramp rate of 5° C./min. FIG. 2A shows the electrodes before carbonization. FIG. 2B shows the electrodes after carbonization. The nickel foam template was dissolved using aqua regia.

The NSPG electrode material was washed with ultrapure water and dried at 80° C. in an oven to obtain pure NSPG electrode material.

Example 2: Characterization of Nitrogen and Sulfur Porous Graphene (NSPG) Electrode Material by Raman Spectroscopy The NSPG electrode was characterized using the LabRAM HR Evolution Raman Spectroscopy system.

The Raman spectra obtained from the NSPG electrode were analyzed at two different resolutions: 2 μm and 40 μm. At 2 μm resolution, the Raman map provided detailed information about the spatial distribution of the Raman-active modes in the sample. This high-resolution analysis allowed for the identification of regions of the Ni foam coated with graphene, determination of the uniformity of the graphene coating, and potential identification of areas with different numbers of graphene layers or with defects in the graphene. At 40 μm resolution, the Raman map provided a more macroscopic view of the sample. While it did not provide the same level of detail about the local properties of the graphene or the Ni foam as the higher resolution image, it was useful for identifying larger-scale trends or variations in the graphene coating on the Ni foam.

The Raman spectroscopy analysis provided information about the NSPG electrode. The detailed spectral and spatial data obtained help understand the performance of the NSPG electrode in electrochemical applications. The choice of instrument setup, acquisition options, and acquisition parameters played a significant role in the quality and type of data obtained.

Example 2: Characterization of Nitrogen and Sulfur Porous Graphene (NSPG) Electrode Material by X-Ray Photoelectron Spectroscopy (XPS)

The NSPG electrode was characterized by XPS. Table 1 below shows the atomic percent of elements in the synthesized NSPG electrode.

TABLE 1

Atomic percent of elements in the synthesized NSPG electrode

| Name | Peak BE eV | Height CPS | Area (P) CPS. eV | Atomic % |
|---|---|---|---|---|
| S2p | 170.2 | 589.98 | 1106.43 | 0.24 |
| C1s | 292.3 | 31593.25 | 83009.32 | 36.78 |
| N1s | 406 | 353.2 | 1371.75 | 0.39 |
| O1s | 536.8 | 153906 | 342156.91 | 62.59 |

The XPS data shows a significant amount of oxygen (O1s—62.59 atomic %) in the NSPG electrode material. This suggests that oxygen is present in the material, likely in the form of oxygen-containing functional groups on the graphene sheets. The high oxygen content in the nitrogen and sulfur co-doped porous graphene (NSPG) arose from the graphene oxide precursor used in the synthesis. Graphene oxide (GO) is heavily oxygenated, with oxygen-containing functional groups such as hydroxyl (—OH), epoxy (—O—), carbonyl (=O), and carboxyl (—COOH) groups attached to the graphene sheets. During the reduction process to form NSPG, not all of these oxygen-containing groups were removed, leading to residual oxygen in the final. The exact amount of residual oxygen can depend on the specific reduction conditions used, including the temperature, duration, and type of reducing agent. Furthermore, X-ray photoelectron spectroscopy (XPS) is a surface-sensitive technique, meaning it primarily detects elements present at the surface of the material. As such, the high oxygen content detected by XPS could be due in part to surface oxidation of the NSPG material, which occurred when the material was exposed to air or moisture.

Example 3-2032 Coin Cells

Coin Cell Manufacturing

A coin cell was assembled using a NSPG electrode, a market-acquired $LiFePO_4$ electrode, and a $LiPF_6$ electrolyte in a 2032 form factor coin cell.

The cells were assembled in a nitrogen-filled glove box. This inert environment atmosphere may potentially degrade lithium-based components, typically resulting in reduced performance.

A hydraulic crimper was used to seal the coin cells. Hydraulic crimping may introduce additional stress on the cell components compared to more specialized sealing methods.

Performance of Coin Cells

The performance of the coin cell was tested using the parameters listed in Table 2.

TABLE 2

Test information to measure performance of the assembled coin cell.

Test Information

| Start Step | 1 | Cycle counts | 32 cycle | Record Qualification | 5 sec/ |
|---|---|---|---|---|---|
| Voltage Measuring-range | 5 V | Current Constant | +3000/ −3000 mA | | 10.0 mA/ 1000.0 mV |

The step setting scheme used to measure the performance of the assembled coin cell is shown in Table 3.

TABLE 3

Step setting scheme.

| StepNum | Step Type | Time (mm:ss) | Vol (V) | Cur (mA) |
|---|---|---|---|---|
| 1 | Rest | 10:00 | | |
| 2 | CC_DChg | | 2.8 | 8.9 |
| 3 | Rest | 10:00 | | |
| 4 | CC_Chg | | 4.3 | 8.9 |
| 5 | CV_Chg | | 4.3 | 0.4 |
| 6 | Rest | 10:00 | | |
| 7 | Cycle | Start Step: 2 | Cycle Total: 30 | |
| 8 | Stop | | | |

The measured raw cycle data is shown in Table 4.

TABLE 4

Cycle data from the coin cell.

| Cycle ID | RCap_Chg (mAh/g) | RCap_DChg (mAh/g) | Efficiency (%) | CC_Chg_Rat (%) | REngy_Chg (mWh/g) |
|---|---|---|---|---|---|
| 1 | 295.2 | 256.49928 | 86.89 | 84.27 | 537.9 |
| 2 | 294.5 | 251.0907 | 85.26 | 83.49 | 531.77 |
| 3 | 290.8 | 245.92956 | 84.57 | 83.56 | 530.13 |

TABLE 4-continued

Cycle data from the coin cell.

| Cycle ID | RCap_Chg (mAh/g) | RCap_DChg (mAh/g) | Efficiency (%) | CC_Chg_Rat (%) | REngy_Chg (mWh/g) |
|---|---|---|---|---|---|
| 4 | 282.3 | 237.01908 | 83.96 | 83.68 | 520.81 |
| 5 | 274.3 | 229.64396 | 83.72 | 82.94 | 517.07 |
| 6 | 267.4 | 221.51416 | 82.84 | 82.55 | 516.56 |
| 7 | 258.6 | 213.0864 | 82.4 | 82.48 | 507.9 |
| 8 | 249.4 | 205.82982 | 82.53 | 81.96 | 504.3 |
| 9 | 232.3 | 191.81011 | 82.57 | 81.42 | 497.8 |
| 10 | 227.1 | 187.63002 | 82.62 | 81.5 | 487.76 |
| 11 | 214.2 | 176.80068 | 82.54 | 81.22 | 481 |
| 12 | 203.1 | 167.84184 | 82.64 | 80.52 | 474.11 |
| 13 | 196.5 | 160.83525 | 81.85 | 80.89 | 469.6 |
| 14 | 188.8 | 153.07904 | 81.08 | 80.79 | 465 |
| 15 | 172.1 | 139.50426 | 81.06 | 80.27 | 464.93 |
| 16 | 164.1 | 133.34766 | 81.26 | 79.34 | 457.1 |
| 17 | 158.8 | 127.78636 | 80.47 | 79.69 | 440.85 |
| 18 | 147.2 | 118.14272 | 80.26 | 79.73 | 432.79 |
| 19 | 133.4 | 106.97346 | 80.19 | 78.97 | 420.3 |
| 20 | 129.5 | 103.8072 | 80.16 | 78.89 | 413.15 |
| 21 | 125 | 99.8875 | 79.91 | 78.68 | 411.9 |
| 22 | 124.8 | 99.36576 | 79.62 | 77.86 | 411.8 |
| 23 | 124.7 | 98.74993 | 79.19 | 77.09 | 411.3 |
| 24 | 122 | 96.6362 | 79.21 | 76.23 | 409.88 |
| 25 | 121.5 | 95.4261 | 78.54 | 76.56 | 409.71 |
| 26 | 122.5 | 95.893 | 78.28 | 76.01 | 409.13 |
| 27 | 122.4 | 95.93712 | 78.38 | 76.06 | 409.12 |
| 28 | 121.6 | 94.9696 | 78.1 | 75.4 | 409.08 |
| 29 | 120.8 | 93.9824 | 77.8 | 74.87 | 408.94 |
| 30 | 117.6 | 91.35168 | 77.68 | 73.71 | 408.8 |
| 31 | 117.8 | 90.44684 | 76.78 | 72.31 | 408.81 |
| 32 | 117.7 | 90.24059 | 76.67 | 71.68 | 408.72 |

The measured step data is shown in Table 5.

TABLE 5

Cycle data from the coin cell.

| Cycle ID | Step ID | Step Type | Start Vol (mV) | End Vol (mV) |
|---|---|---|---|---|
| 1 | 1 | Rest | 3830.6 | 3816.7 |
| 1 | 2 | CC_DChg | 3816.4 | 2799.7 |
| 1 | 3 | Rest | 2800.9 | 2818.9 |
| 2 | 4 | CC_Chg | 2820.7 | 4299.3 |
| 2 | 5 | CV_Chg | 4299.6 | 4299.6 |
| 2 | 6 | Rest | 4297.1 | 4272.8 |
| 2 | 7 | CC_DChg | 4270.9 | 2796.3 |
| 2 | 8 | Rest | 2796.2 | 2885.7 |
| 3 | 9 | CC_Chg | 2889.7 | 4299.6 |
| 3 | 10 | CV_Chg | 4299.6 | 4299.6 |
| 3 | 11 | Rest | 4298.5 | 4278.9 |
| 3 | 12 | CC_DChg | 4278.8 | 2788 |
| 3 | 13 | Rest | 2788.3 | 2889.7 |
| 4 | 14 | CC_Chg | 2900.4 | 4299.6 |
| 4 | 15 | CV_Chg | 4299.6 | 4299.6 |
| 4 | 16 | Rest | 4295.3 | 4269.4 |
| 4 | 17 | CC_DChg | 4267.1 | 2797.7 |
| 4 | 18 | Rest | 2800.3 | 2874.3 |
| 5 | 19 | CC_Chg | 2879.3 | 4299.6 |
| 5 | 20 | CV_Chg | 4299.6 | 4299.6 |
| 5 | 21 | Rest | 4298.2 | 4268.1 |
| 5 | 22 | CC_DChg | 4266.2 | 2796.8 |
| 5 | 23 | Rest | 2797.2 | 2863.7 |
| 6 | 24 | CC_Chg | 2869.6 | 4299.6 |
| 6 | 25 | CV_Chg | 4299.6 | 4299.6 |
| 6 | 26 | Rest | 4296.4 | 4265.9 |
| 6 | 27 | CC_DChg | 4262.3 | 2798.6 |
| 6 | 28 | Rest | 2799.4 | 2854.1 |
| 7 | 29 | CC_Chg | 2859.6 | 4299.6 |
| 7 | 30 | CV_Chg | 4299.6 | 4299.6 |
| 7 | 31 | Rest | 4296.6 | 4274.5 |
| 7 | 32 | CC_DChg | 4273.8 | 2800.8 |
| 7 | 33 | Rest | 2800.9 | 2854.9 |
| 8 | 34 | CC_Chg | 2856.9 | 4299.6 |
| 8 | 35 | CV_Chg | 4299.6 | 4299.6 |
| 8 | 36 | Rest | 4293.2 | 4270.5 |
| 8 | 37 | CC_DChg | 4268.7 | 2801.7 |
| 8 | 38 | Rest | 2800.9 | 2895.6 |
| 9 | 39 | CC_Chg | 2901.4 | 4299.6 |
| 9 | 40 | CV_Chg | 4299.6 | 4299.6 |
| 9 | 41 | Rest | 4291.7 | 4269.9 |
| 9 | 42 | CC_DChg | 4265.3 | 2800.5 |
| 9 | 43 | Rest | 2802.6 | 2886.9 |
| 10 | 44 | CC_Chg | 2906.4 | 4299.6 |
| 10 | 45 | CV_Chg | 4299.6 | 4299.6 |
| 10 | 46 | Rest | 4299.1 | 4279.5 |
| 10 | 47 | CC_DChg | 4278.1 | 2799.6 |
| 10 | 48 | Rest | 2804.1 | 2871.4 |
| 11 | 49 | CC_Chg | 2879.6 | 4299.6 |
| 11 | 50 | CV_Chg | 4299.6 | 4299.6 |
| 11 | 51 | Rest | 4297.1 | 4278.5 |
| 11 | 52 | CC_DChg | 4277.8 | 2797.8 |
| 11 | 53 | Rest | 2799.5 | 2885.7 |
| 12 | 54 | CC_Chg | 2899.1 | 4299.6 |
| 12 | 55 | CV_Chg | 4299.6 | 4299.6 |
| 12 | 56 | Rest | 4292.4 | 4269.1 |
| 12 | 57 | CC_DChg | 4264.6 | 2804.6 |
| 12 | 58 | Rest | 2809.1 | 2887.5 |
| 13 | 59 | CC_Chg | 2889.6 | 4299.6 |
| 13 | 60 | CV_Chg | 4299.6 | 4299.6 |
| 13 | 61 | Rest | 4298.7 | 4266.7 |
| 13 | 62 | CC_DChg | 4264.1 | 2801.1 |
| 13 | 63 | Rest | 2805.4 | 2874.5 |
| 14 | 64 | CC_Chg | 2877.6 | 4299.6 |
| 14 | 65 | CV_Chg | 4299.6 | 4299.6 |
| 14 | 66 | Rest | 4297.2 | 4269.3 |
| 14 | 67 | CC_DChg | 4268.3 | 2803.4 |
| 14 | 68 | Rest | 2808.9 | 2873 |
| 15 | 69 | CC_Chg | 2874.9 | 4299.1 |
| 15 | 70 | CV_Chg | 4299.3 | 4299.6 |
| 15 | 71 | Rest | 4292.5 | 4268.4 |
| 15 | 72 | CC_DChg | 4263.2 | 2798.3 |
| 15 | 73 | Rest | 2798.7 | 2868 |
| 16 | 74 | CC_Chg | 2869.6 | 4299.7 |
| 16 | 75 | CV_Chg | 4299.6 | 4299.3 |
| 16 | 76 | Rest | 4297.1 | 4265.3 |
| 16 | 77 | CC_DChg | 4260.2 | 2802.6 |
| 16 | 78 | Rest | 2809.8 | 2873.2 |
| 17 | 79 | CC_Chg | 2875.9 | 4299.7 |
| 17 | 80 | CV_Chg | 4300.9 | 4300.9 |
| 17 | 81 | Rest | 4298.6 | 4269.1 |
| 17 | 82 | CC_DChg | 4268.8 | 2808.4 |
| 17 | 83 | Rest | 2808.6 | 2871.1 |
| 18 | 84 | CC_Chg | 2874.6 | 4299.7 |
| 18 | 85 | CV_Chg | 4300.9 | 4300.9 |
| 18 | 86 | Rest | 4298.7 | 4268.3 |
| 18 | 87 | CC_DChg | 4267.8 | 2801.7 |
| 18 | 88 | Rest | 2813.9 | 2869.2 |
| 19 | 89 | CC_Chg | 2869.6 | 4299.7 |
| 19 | 90 | CV_Chg | 4300.9 | 4300.9 |
| 19 | 91 | Rest | 4290.7 | 4261.9 |
| 19 | 92 | CC_DChg | 4259.1 | 2799.1 |
| 19 | 93 | Rest | 2801 | 2878.2 |
| 20 | 94 | CC_Chg | 2878.9 | 4299.7 |
| 20 | 95 | CV_Chg | 4299.6 | 4299.6 |
| 20 | 96 | Rest | 4292.1 | 4263.8 |

TABLE 5-continued

Cycle data from the coin cell.

| Cycle ID | Step ID | Step Type | Start Vol (mV) | End Vol (mV) |
|---|---|---|---|---|
| 20 | 97 | CC_DChg | 4263.4 | 2799.3 |
| 20 | 98 | Rest | 2803.7 | 2886 |
| 21 | 99 | CC_Chg | 2889.6 | 4299.1 |
| 21 | 100 | CV_Chg | 4299.6 | 4299.6 |
| 21 | 101 | Rest | 4299.3 | 4274.4 |
| 21 | 102 | CC_DChg | 4271.4 | 2804.4 |
| 21 | 103 | Rest | 2808.7 | 2878.9 |
| 22 | 104 | CC_Chg | 2880 | 4299.3 |
| 22 | 105 | CV_Chg | 4299.6 | 4299.6 |
| 22 | 106 | Rest | 4299.5 | 4274.1 |
| 22 | 107 | CC_DChg | 4271 | 2801.1 |
| 22 | 108 | Rest | 2808.9 | 2880.7 |
| 23 | 109 | CC_Chg | 2880.9 | 4298.9 |
| 23 | 110 | CV_Chg | 4299.6 | 4299.6 |
| 23 | 111 | Rest | 4297.1 | 4270.8 |
| 23 | 112 | CC_DChg | 4269.9 | 2802.4 |
| 23 | 113 | Rest | 2807.2 | 2883.5 |
| 24 | 114 | CC_Chg | 2885 | 4299 |
| 24 | 115 | CV_Chg | 4299.6 | 4299.6 |
| 24 | 116 | Rest | 4295.1 | 4269.5 |
| 24 | 117 | CC_DChg | 4261.1 | 2811.1 |
| 24 | 118 | Rest | 2816.2 | 2885.9 |
| 25 | 119 | CC_Chg | 2887.1 | 4299.3 |
| 25 | 120 | CV_Chg | 4299.6 | 4299.6 |
| 25 | 121 | Rest | 4296.7 | 4268.1 |
| 25 | 122 | CC_DChg | 4265.2 | 2805.2 |
| 25 | 123 | Rest | 2807.3 | 2884.3 |
| 26 | 124 | CC_Chg | 2885.1 | 4299.3 |
| 26 | 125 | CV_Chg | 4299.6 | 4299.9 |
| 26 | 126 | Rest | 4299.9 | 4278.9 |
| 26 | 127 | CC_DChg | 4273.1 | 2803.1 |
| 26 | 128 | Rest | 2803.1 | 2875.1 |
| 27 | 129 | CC_Chg | 2875.5 | 4299.3 |
| 27 | 130 | CV_Chg | 4299.6 | 4299.6 |
| 27 | 131 | Rest | 4297.8 | 4278.5 |
| 27 | 132 | CC_DChg | 4272.4 | 2802.4 |
| 27 | 133 | Rest | 2802.3 | 2875.2 |
| 28 | 134 | CC_Chg | 2875.9 | 4299.3 |
| 28 | 135 | CV_Chg | 4299.9 | 4299.6 |
| 28 | 136 | Rest | 4296.6 | 4278.2 |
| 28 | 137 | CC_DChg | 4271.5 | 2801.5 |
| 28 | 138 | Rest | 2802.9 | 2875.6 |
| 29 | 139 | CC_Chg | 2877.2 | 4299.3 |
| 29 | 140 | CV_Chg | 4299.9 | 4299.6 |
| 29 | 141 | Rest | 4295.7 | 4277 |
| 29 | 142 | CC_DChg | 4275.2 | 2799.9 |
| 29 | 143 | Rest | 2803.2 | 2876.1 |
| 30 | 144 | CC_Chg | 2876.5 | 4299.3 |
| 30 | 145 | CV_Chg | 4299.6 | 4299.6 |
| 30 | 146 | Rest | 4296.3 | 4272.1 |
| 30 | 147 | CC_DChg | 4272.1 | 2801.2 |
| 30 | 148 | Rest | 2809.9 | 2873.8 |
| 31 | 149 | CC_Chg | 2875.5 | 4299.3 |
| 31 | 150 | CV_Chg | 4299.6 | 4299.6 |
| 31 | 151 | Rest | 4296.6 | 4266.1 |
| 31 | 152 | CC_DChg | 4261.2 | 2800.3 |
| 31 | 153 | Rest | 2807.1 | 2878.5 |
| 32 | 154 | CC_Chg | 2881.1 | 4299.3 |
| 32 | 155 | CV_Chg | 4299.9 | 4299.9 |
| 32 | 156 | Rest | 4298.1 | 4265.5 |

The start voltage, mid-voltage, and end voltage of the CC_DChg step is shown in Table 6.

TABLE 6

Start voltage and end voltage of the CC_DChg step

| Step Type | Start Vol (mV) | End Vol (mV) | Mid Vol (mV) |
|---|---|---|---|
| CC_DChg | 3816.4 | 2799.7 | 3308.05 |
| CC_DChg | 4270.9 | 2796.3 | 3533.6 |
| CC_DChg | 4278.8 | 2788 | 3533.4 |
| CC_DChg | 4267.1 | 2797.7 | 3532.4 |
| CC_DChg | 4266.9 | 2796.8 | 3531.85 |
| CC_DChg | 4262.3 | 2798.6 | 3530.45 |
| CC_DChg | 4273.8 | 2800.8 | 3537.3 |
| CC_DChg | 4268.7 | 2801.7 | 3535.2 |
| CC_DChg | 4265.3 | 2800.5 | 3532.9 |
| CC_DChg | 4278.1 | 2799.6 | 3538.85 |
| CC_DChg | 4277.8 | 2797.8 | 3537.8 |
| CC_DChg | 4264.6 | 2804.6 | 3534.6 |
| CC_DChg | 4264.1 | 2801.1 | 3532.6 |
| CC_DChg | 4268.3 | 2803.4 | 3535.85 |
| CC_DChg | 4263.2 | 2798.3 | 3530.75 |
| CC_DChg | 4260.2 | 2802.6 | 3531.4 |
| CC_DChg | 4268.8 | 2808.4 | 3538.6 |
| CC_DChg | 4267.8 | 2801.7 | 3534.75 |
| CC_DChg | 4259.1 | 2799.1 | 3529.1 |
| CC_DChg | 4263.4 | 2799.3 | 3531.35 |
| CC_DChg | 4271.4 | 2804.4 | 3537.9 |
| CC_DChg | 4271 | 2801.1 | 3536.05 |
| CC_DChg | 4269.9 | 2802.4 | 3536.15 |
| CC_DChg | 4261.1 | 2811.1 | 3536.1 |
| CC_DChg | 4265.2 | 2805.2 | 3535.2 |
| CC_DChg | 4273.1 | 2803.1 | 3538.1 |
| CC_DChg | 4272.4 | 2802.4 | 3537.4 |
| CC_DChg | 4271.5 | 2801.5 | 3536.5 |
| CC_DChg | 4275.2 | 2799.9 | 3537.55 |
| CC_DChg | 4272.1 | 2801.2 | 3536.65 |
| CC_DChg | 4261.2 | 2800.3 | 3530.75 |

The nominal voltage was determined to be 3527.39 mV by calculating the average of the mid voltage in the CC_DChg step shown in Table 6.

The raw data shown in Tables 4-5 was analyzed using the equations listed in Table 7 to determine the capacity (mAh), charge time (hrs), capacity retention (%), capacity fade (mAh/g), coulombic efficiency (%), and state of health (SoH). As shown in Table 7, capacity was determined by multiplying the specific capacity with the mass of the active material. The charging current used for the analysis was 8.9 mA. The amount of active material in electrode was 0.3 g.

TABLE 7

Equations used to determine the coin cell properties.

| | |
|---|---|
| Capacity (mAh) | RCap (mAh/g) × mass (g) of Active Material in the electrode |
| Charge/Discharge Time (hrs) | Capacity (mAh)/Charge or Discharge Current (mA) |
| Capacity Retention (%) | RCap_DChg (Cycle N)/Rcap_DChg (Cycle 1) × 100% |
| Capacity Fade (mAh/g) | RCap_DChg (Cycle 1) − RCap_DChg (Cycle N) |
| Coulombic Efficiency (%) | RCap_DChg/RCap_Chg × 100% |
| State of Health (SoH) (%) | Capacity (Cycle N)/Capacity (Cycle 1) × 100% |

Table 8 shows the results of the analysis of the raw data in Tables 4 and 5 using the formulae in Table 6.

TABLE 8

Properties of the coin cell with the NSPG electrode.

| Cycle ID | Capacity (mAh) | Charge Time (hrs) | Capacity Retention (%) | Capacity Fade (mAh/g) | Coulombic Efficiency (%) | State of Health (SoH) (%) |
|---|---|---|---|---|---|---|
| 1 | 88.56 | 9.950561798 | 100 | 0 | 86.89 | 100 |
| 2 | 88.35 | 9.926966292 | 97.89138589 | 5.40858 | 85.26 | 99.76287263 |
| 3 | 87.24 | 9.802247191 | 95.87923989 | 10.56972 | 84.57 | 98.50948509 |
| 4 | 84.69 | 9.515730337 | 92.405388 | 19.4802 | 83.96 | 95.630013 |
| 5 | 82.29 | 9.246067416 | 89.53006028 | 26.85532 | 83.72 | 92.9200542 |
| 6 | 80.22 | 9.013483146 | 86.36053871 | 34.98512 | 82.84 | 90.58265583 |
| 7 | 77.58 | 8.716853933 | 83.07485308 | 43.41288 | 82.4 | 87.60162602 |
| 8 | 74.82 | 8.406741573 | 80.24576911 | 50.66946 | 82.53 | 84.48509485 |
| 9 | 69.69 | 7.830337079 | 74.77997989 | 64.68917 | 82.57 | 78.69241192 |
| 10 | 68.13 | 7.65505618 | 73.1503106 | 68.86926 | 82.62 | 76.93089431 |
| 11 | 64.26 | 7.220224719 | 68.92833383 | 79.6986 | 82.54 | 72.56097561 |
| 12 | 60.93 | 6.846067416 | 65.43559888 | 88.65744 | 82.64 | 68.80081301 |
| 13 | 58.95 | 6.623595506 | 62.70397718 | 95.66403 | 81.85 | 66.56504065 |
| 14 | 56.64 | 6.364044944 | 59.68010514 | 103.42024 | 81.08 | 63.95663957 |
| 15 | 51.63 | 5.801123569 | 54.3877784 | 116.99502 | 81.06 | 58.29945799 |
| 16 | 49.23 | 5.531460674 | 51.98753774 | 123.15162 | 81.26 | 55.58943089 |
| 17 | 47.64 | 5.352808989 | 49.81938351 | 128.71292 | 80.47 | 53.79403794 |
| 18 | 44.16 | 4.961797753 | 46.05966925 | 138.35656 | 80.26 | 49.86449864 |
| 19 | 40.02 | 4.496629213 | 41.7051697 | 149.52582 | 80.19 | 45.1897019 |
| 20 | 38.85 | 4.365168539 | 40.47075688 | 152.69208 | 80.16 | 43.86856369 |
| 21 | 37.5 | 4.213483146 | 38.94260444 | 156.61178 | 79.91 | 42.34417344 |
| 22 | 37.44 | 4.206741573 | 38.73919646 | 157.13352 | 79.62 | 42.27642276 |
| 23 | 37.41 | 4.20337078 | 38.49910612 | 157.74935 | 79.19 | 42.24254743 |
| 24 | 36.6 | 4.112359551 | 37.67503753 | 159.86308 | 79.21 | 41.32791328 |
| 25 | 36.45 | 4.095505618 | 37.20326232 | 161.07318 | 78.54 | 41.15853659 |
| 26 | 36.75 | 4.129213483 | 37.38529013 | 160.60628 | 78.28 | 41.49728997 |
| 27 | 36.72 | 4.125842697 | 37.40249095 | 160.56216 | 78.38 | 41.46341463 |
| 28 | 36.48 | 4.098876404 | 37.02528912 | 161.52968 | 78.1 | 41.19241192 |
| 29 | 36.24 | 4.071910112 | 36.64041474 | 162.51688 | 77.8 | 40.92140921 |
| 30 | 35.28 | 3.964044944 | 35.61479003 | 165.1476 | 77.68 | 38.83739837 |
| 31 | 35.34 | 3.970786517 | 35.26202491 | 166.05244 | 76.78 | 39.90514905 |
| 32 | 35.31 | 3.96741573 | 35.18161532 | 166.25869 | 76.67 | 39.87127371 |

The average capacity of the coin cell was calculated by taking the average of all the cell capacities in Table 8. The average coin cell capacity was 54.73 mAh.

The average charge time of the coin cell was calculated by taking the average of all the charge times in Table 8. The average charge time was 6.15 hrs.

Figure 5:
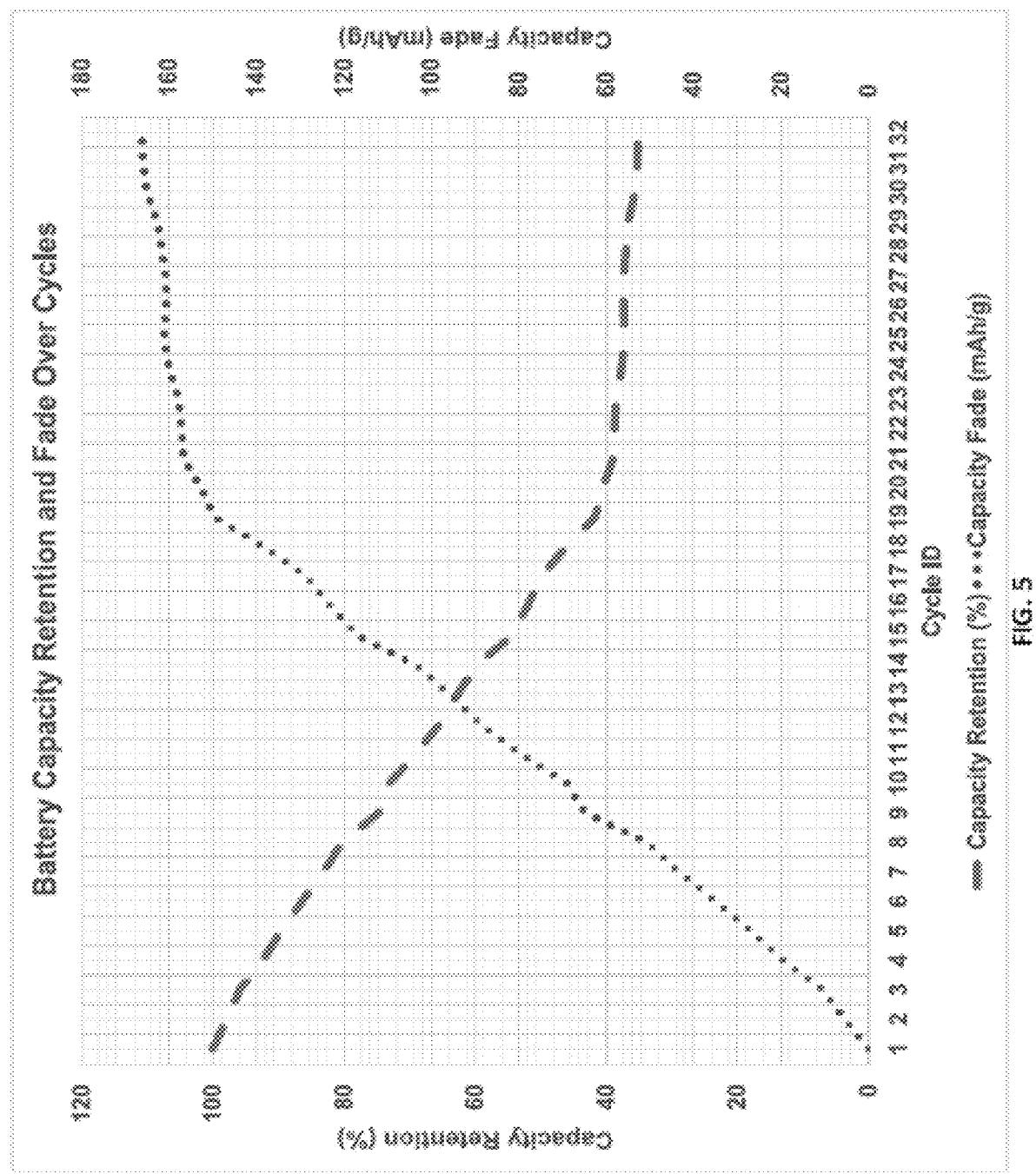
FIG. 5 shows representative line charts showing capacity retention and capacity fade over cycles according to some embodiments of the present disclosure.
Figure 6:
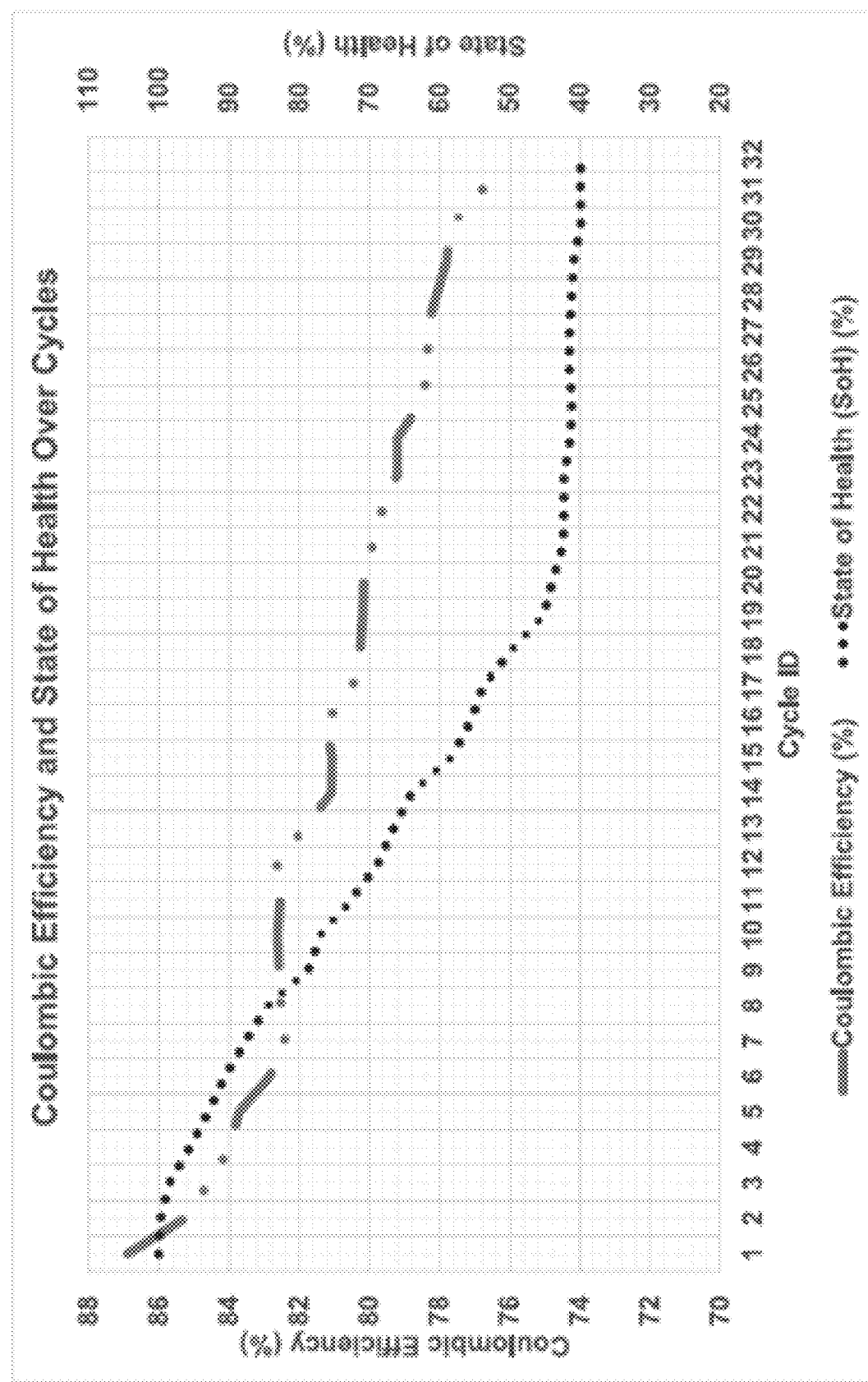
FIG. 6 shows representative line charts showing coulombic efficiency and state of health over cycles according to some embodiments of the present disclosure.
Figure 7:
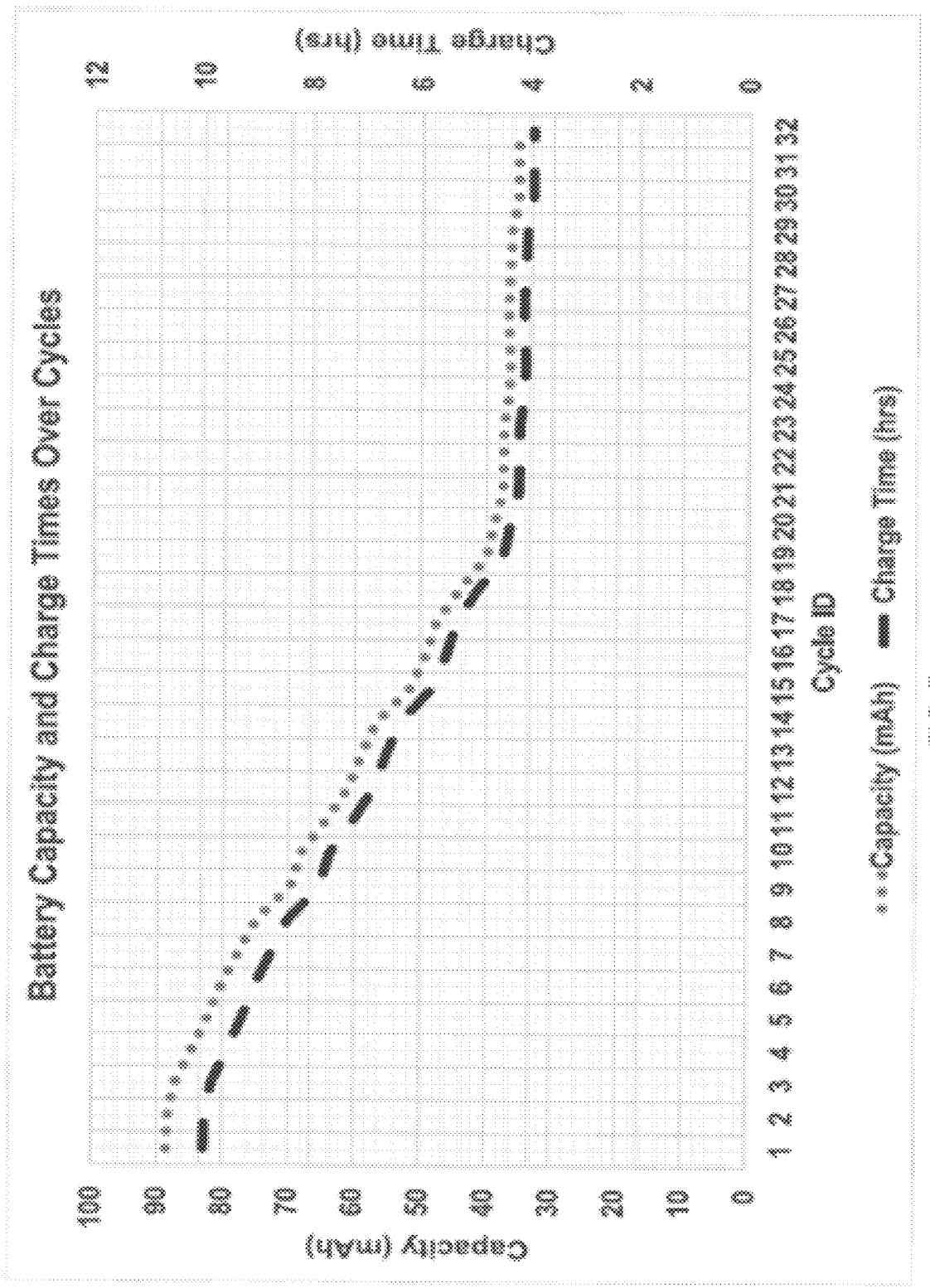
FIG. 7 shows representative line charts showing battery capacity and charge time over cycles according to some embodiments of the present disclosure.

The analyzed data in Table 8 is represented graphically in FIGS. 5-7. FIG. 5 represents line plots showing capacity retention (%) vs. cycle and capacity fade (mAh/g) vs. cycle of the coin cell. FIG. 6 represents line plots showing coulombic efficiency (%) vs. cycle and state of health (SoH) (%) vs. cycle of the coin cell. FIG. 7 represents line plots showing capacity (mAh) vs. cycle and charge time (hours) vs. cycle of the coin cell.

The coin cell achieved a voltage 4.3 V, which is significantly higher than the typical 3.6 V of conventional lithium-ion cells. This higher voltage potentially allows for more efficient energy storage and use.

The coin cell achieved an energy density of 537.9 Wh/kg, a substantial improvement over conventional lithium-based cells, which typically offer 200-300 Wh/kg. The coin cells demonstrated an increase in energy density of 68-169% compared to conventional technology.

The coin cell demonstrated a capacity of 54.73 mAh. The achieved capacity significantly outperformed the state-of-the-art based coin cells, which typically offer only around 30 mAh.

Despite the manufacturing conditions stated above, the inventive NSPG electrodes demonstrated superior performance, underscoring the robustness and potential of our technology. The versatility shown by both electrode configurations suggests broad potential applications.

Example 4—Assemble a Battery Using the Disclosed Electrodes

To assemble a battery using NSPG and TRG graphene-based electrodes, the dual-ion concept will be leveraged, which involves the simultaneous intercalation of both cations and anions into the electrodes during charge and discharge cycles. This approach is critical for enhancing the energy density and cycling stability of the battery. The electrochemical aspect of this assembly is central to its performance, and the choice of electrolyte and additives will play a significant role.

For optimal performance, it is intended to utilize ionic liquid electrolytes due to their high electrochemical stability and non-flammability. Specifically, 1-butyl-1-methylpyrrolidinium bis(trifluoromethylsulfonyl)imide (Pyr14TFSI) will be selected, an ionic liquid electrolyte, known for its extended anodic stability and reduced risk of solvent co-intercalation at high potentials. However, Pyr14TFSI alone can cause issues such as graphene exfoliation when used with graphene anodes, leading to poor overall performance. To mitigate this issue, certain additives that form a stable solid electrolyte interphase (SEI) on the graphene surface will be incorporated.

Fluoroethylene carbonate (FEC), a carbonate additive, and ethylene sulfite (ES), a sulfite additive, will be key additives to enhance the performance of the Pyr14TFSI electrolyte in DCBs. FEC is highly effective in improving the electrochemical stability of the electrolyte. During the initial charging cycles, FEC will decompose to form a stable and robust SEI layer on the anode's surface. This SEI layer will prevent further electrolyte decomposition, reduce side reactions, and enhance overall cycling stability. FEC is particularly beneficial for high-voltage applications as it maintains the integrity of the electrode materials and minimizes capacity fade over extended cycling.

Similarly, ES will decompose to form a protective SEI on the electrode surfaces, stabilizing the electrolyte and preventing detrimental side reactions. ES is especially effective in improving the low-temperature performance of batteries and increasing their overall efficiency. By incorporating ES into the electrolyte, the reversible capacity and cycling stability of the battery will be significantly improved.

In addition to these non-salt additives, certain salt additives will also be used to further enhance the electrolyte's performance. Salts such as lithium bis(trifluoromethanesulfonyl)imide (LiTFSI), a lithium salt, and lithium hexafluorophosphate (LiPF6), another lithium salt, will help maintain high ionic conductivity and stability of the electrolyte, crucial for the efficient operation of the battery. These salts will support the dual-ion intercalation process by providing a stable ionic environment for both cations and anions.

In the electrochemical operation of our dual carbon battery, the NSPG and TRG graphene-based electrodes will work synergistically to facilitate the dual-ion concept. During the charging process, cations (such as Li+) will intercalate into the NSPG electrode, while anions (such as TFSI− or PF6−) will intercalate into the TRG electrode. This simultaneous intercalation increases the energy storage capacity of the battery by utilizing both electrodes for ion storage. The use of Pyr14TFSI, enhanced with FEC and ES, will ensure that these intercalation processes occur efficiently and stably, even at high voltages.

The enhanced SEI layers formed by FEC and ES additives will protect the electrode materials from degradation, thereby improving the cycle life of the battery. These SEI layers will also reduce the overall impedance of the battery, leading to higher Coulombic efficiency and better power performance. The inclusion of LiTFSI or LiPF6 salts will further improve the ionic conductivity of the electrolyte, ensuring rapid ion transport and reducing polarization during high-rate cycling.

Overall, by carefully selecting and optimizing the electrolyte and additives, the assembled DCB should achieve superior electrochemical performance. This will include high energy density, excellent cycling stability, and robust safety characteristics, making it a viable and efficient energy storage solution leveraging the dual-ion intercalation concept.

Numerous examples are provided herein to enhance the understanding of the present disclosure. A specific set of statements are provided as follows.

Statement 1: An electrode material comprising graphene, a plurality of dopants, and interconnected porous structures comprising a plurality of pores.

Statement 2: The electrode material of statement 1, wherein the plurality of dopants comprises nitrogen, sulfur, phosphorous, boron, transition metals, and a combination thereof.

Statement 3: The electrode material of statement 2, wherein the plurality of dopants is nitrogen and sulfur.

Statement 4: The electrode material of statement 1, wherein the plurality of pores comprises an average pore size ranging from 0.5 nm to 55 nm.

Statement 5: The electrode material of statement 4, wherein the plurality of pores comprises an average pore size ranging from 5 nm to 50 nm.

Statement 6: The electrode material of statement 1, wherein the plurality of pores comprises a surface area ranging from 400 $m^2/g$ to 1000 $m^2/g$.

Statement 7: The electrode material of statement 6, wherein the plurality of pores comprises a surface area ranging from 500 $m^2/g$ to 800 $m^2/g$.

Statement 8: The electrode material of statement 1, wherein the plurality of pores comprises an average pore volume ranging from 0.2 $cm^3/g$ to 2.0 $cm^3/g$.

Statement 9: The electrode material of statement 9, wherein the plurality of pores comprises an average pore volume ranging from 0.5 $cm^3/g$ to 1.0 $cm^3/g$.

Statement 10: The electrode material of statement 1, wherein the plurality of pores comprises an average depth ranging from 5 nm to 150 nm.

Statement 11: The electrode material of statement 10, wherein the plurality of pores comprises an average depth ranging from 10 nm to 100 nm.

Statement 12: The electrode material of statement 3, wherein the nitrogen and sulfur are derived from natural polymers, thioacetamide, sodium sulfide, elemental sulfur, thiourea, or combinations thereof.

Statement 13: The electrode material of statement 12, wherein the natural polymers comprise cellulose, alginate, lignin, or combinations thereof.

Statement 14: The electrode material of statement 3, wherein the electrode material formula is $C_xN_yS_zO_w$.

Statement 15: The electrode material of statement 14, wherein the formula is $C_6N_2S$.

Statement 16: The electrode material of statement 1, wherein the electrode has an electrical conductivity ranging from 1000 S/m to 5000 S/m.

Statement 17: The electrode material of statement 1, wherein the electrode has a specific surface area ranging from 500 $m^2/g$ to 1500 $m^2/g$.

Statement 18: The electrode material of statement 1, wherein the electrode has a capacity retention of over 90% after one thousand cycles of charge/discharge cycles.

Statement 19: A composition comprising a porous graphene doped with nitrogen and sulfur.

Statement 20: The composition of statement 19, further comprising deionized water, residual acid, and/or a cross-linking agent.

Statement 21: The composition of statement 18, wherein the porous graphene doped with nitrogen and sulfur is suitable for use as an electrode material.

Statement 22: An electrode comprising the electrode material of statements 1-18.

Statement 23: The electrode of statement 22, wherein the electrode is an anode.

Statement 24: The electrode of statement 22, wherein the electrode is a cathode.

Statement 25: A device comprising the electrode material of statements 1-18, wherein the device comprises an energy storage device, a supercapacitor, an electrochemical sensor, or combinations thereof.

Statement 26: The device of statement 25, wherein the energy storage device comprises lithium-ion batteries, sodium-ion batteries, rechargeable batteries, or combinations thereof.

Statement 27: A method of producing an electrode material for energy storage applications, the method comprising: dispersing graphene oxide in a solvent and ultrasonicating the graphene oxide and the solvent for a first specified time forming a first solution; dissolving a binder in an acid solution forming a second solution; mixing and heating the second solution to a first temperature for a second specified time; adding a dopant source into the second solution forming a third solution; mixing the third solution; adding the first solution into the third solution forming a fourth solution; mixing the fourth solution for a third specified time; cutting metal foam into specified shapes and sizes forming a cut metal foam; dipping the cut metal template into the fourth solution forming a uniformly coated metal foam; adding a cross-linking agent to the uniformly coated metal template to cross-link the nitrogen dopant forming a hydrogel-coated metal foam; treating the hydrogel-coated metal foam with liquid nitrogen and freeze-drying at a second temperature and a first pressure forming a freeze-dried hydrogel-coated metal foam; carbonizing the freeze-dried hydrogel-coated metal foam; dissolving the metal foam template in an etchant forming the electrode material; washing the electrode material with ultrapure water; and drying the electrode material to obtain dried electrode material, wherein the electrode material is a nitrogen and sulfur doped porous graphene (NSPG).

Statement 28: The method of statement 27, wherein the solvent is a polar solvent.

Statement 29: The method of statement 28, wherein the polar solvent comprises deionized water, ethanol, isopropanol, or combinations thereof.

Statement 30: The method of statement 27, wherein the first specified time first specified time ranges from about 1 hour to about 4 hours.

Statement 31: The method of statement 27, wherein the binder comprises chitosan.

Statement 32: The method of statement 27, wherein the acid comprises acetic acid, formic acid, hydrochloric acid, citric acid, or a combination thereof.

Statement 33: The method of statement 27, wherein the pH of the acid solution ranges from about 4 to about 6.

Statement 34: The method of statement 27, wherein the first temperature ranges from about 40° C. to about 60° C.

Statement 35: The method of statement 27, wherein the dopant comprises thiourea.

Statement 36: The method of statement 27, wherein the second specified time ranges from about 0.5 hour to about 2 hours.

Statement 37: The method of statement 27, wherein the metal comprises nickel, copper, or combinations thereof.

Statement 38: The method of statement 27, wherein the third specified time ranges from about 0.5 hour to about 24 hours.

Statement 39: The method of statement 27, wherein the specified shapes comprise sheets, discs, cylinders, or custom geometries.

Statement 40: The method of statement 27, wherein the size ranges from about 2 cm to about 100 cm.

Statement 41: The method of statement 27, wherein the second solution is a uniform homogenous solution.

Statement 42: The method of statement 27, wherein the cross-linking agent comprises glutaraldehyde, formaldehyde, glyoxal, or combinations thereof.

Statement 43: The method of statement 42, wherein the cross-linking agent is glutaraldehyde.

Statement 44: The method of statement 27, wherein the second temperature ranges from about −60° C. to about −30° C.

Statement 45: The method of statement 27, wherein the first pressure ranges from about 1 Pa to about 15 Pa.

Statement 46: The method of statement 27, wherein the carbonizing step further comprises heating the hydrogel-coated metal foam to a third temperature for a fourth specified time at a ramp rate in an inert atmosphere.

Statement 47: The method of statement 46, wherein the third temperature ranges from about 750° C. to about 850° C.

Statement 48: The method of statement 47, wherein the third temperature ranges about 795° C. to about 805° C.

Statement 49: The method of statement 46, wherein the fourth specified time ranges from about 1.5 hours to about 4 hours.

Statement 50: The method of statement 49, wherein the fourth specified time ranges from about 1.9 hours to about 2.1 hours.

Statement 51: The method of statement 46, wherein the ramp rate ranges from about 2° C./min to about 7° C./min.

Statement 52: The method of statement 51, wherein the ramp rate ranges from about 4° C./min to about 6° C./min.

Statement 53: The method of statement 46, wherein the inert atmosphere comprises nitrogen, helium, argon, or combinations thereof.

Statement 54: The method of statement 27, wherein the etchant comprises aqua regia, nitric acid, hydrochloric acid, sulfuric acid, and combinations thereof.

Statement 55: The method of statement 27, wherein the drying the electrode step is performed in an oven at a fourth temperature.

Statement 56: The method of statement 55, wherein the fourth temperature ranges from about 70° C. to about 90° C.

Statement 57: A hydrogel composition comprising shaped nickel (Ni) foam, graphene oxide, chitosan, thiourea, and a crosslinking agent, wherein the hydrogel is formed after the graphene oxide is added to the shaped nickel foam.

Statement 58: The composition of statement 57, wherein the graphene oxide is porous and interconnected.

Statement 59: The composition of statement 57, wherein the graphene oxide is uniformly interconnected.

Statement 60: The composition of statement 57, wherein the graphene oxide is evenly dispersed across the hydrogel surface and the hydrogel core.

Statement 61: The composition of statement 57, wherein the graphene oxide concentration is evenly dispersed throughout the hydrogel.

Statement 62: An anode comprising the composition of statement 57.

Statement 63: A dipped hydrogel composition comprising shaped nickel (Ni) foam, graphene oxide, chitosan, thiourea, and a crosslinking agent; wherein the hydrogel is formed by (a) dipping the shaped nickel (Ni) foam into a solution comprising graphene oxide, chitosan, thiourea; and (b) adding a crosslinking agent.

Statement 64: A composition comprising shaped nickel (Ni) foam and a solution comprising graphene oxide, chitosan, and thiourea, wherein the solution does not comprise a hydrogel.

Statement 65: A composition comprising shaped nickel (Ni) foam and a solution comprising graphene oxide, chitosan, and thiourea, wherein the solution does not comprise an aldehyde or crosslinking agent.

Statement 66: A method of making a dipped hydrogel composition, the method comprising dipping a shaped nickel (Ni) foam into a solution comprising graphene oxide, chitosan, thiourea forming a coated shaped nickel (Ni) foam.

adding a cross-linking agent to cross-link the chitosan forming the dipped hydrogel.

Statement 67: A battery comprising the electrode material of statements 1-18 or statements 89-110.

Statement 68: The battery of statement 67, wherein the battery has a capacity retention of over 90%.

Statement 69: The battery of statement 67, wherein the battery is a coin cell battery.

Statement 70: The battery of statement 69, wherein the voltage is ≥4.3 V, ≥4.2 V, ≥4.1 V, ≥4.0 V, ≥3.9 V, ≥3.8 V, or ≥3.7 V.

Statement 71: The battery of statement 69, wherein the voltage is higher than 3.6 V lithium-ion coin cell batteries.

Statement 72: The battery of statement 69, wherein the battery comprises a 68-169% increase in energy density compared to 3.6 V lithium-ion coin cell batteries.

Statement 73: The battery of statement 69, wherein the battery comprises a capacity of ≥35 mAh, ≥36 mAh, ≥37 mAh, ≥38 mAh, ≥39 mAh, ≥40 mAh, ≥41 mAh, ≥42 mAh, ≥43 mAh, ≥44 mAh, ≥45 mAh, ≥46 mAh, ≥47 mAh, ≥48 mAh, ≥49 mAh, ≥50 mAh, ≥51 mAh, ≥52 mAh, ≥53 mAh, ≥54 mAh, ≥55 mAh, ≥56 mAh, ≥57 mAh, ≥58 mAh, ≥59 mAh, ≥60 mAh, ≥61 mAh, ≥62 mAh, ≥63 mAh, ≥64 mAh, ≥65 mAh, ≥66 mAh, ≥67 mAh, ≥68 mAh, ≥69 mAh, ≥70 mAh, ≥71 mAh, ≥72 mAh, ≥73 mAh, ≥74 mAh, ≥75 mAh, ≥76 mAh, ≥77 mAh, ≥78 mAh, ≥79 mAh, ≥80 mAh, ≥81 mAh, ≥82 mAh, ≥83 mAh, ≥84 mAh, ≥85 mAh, ≥86 mAh, ≥87 mAh, ≥88 mAh, ≥89 mAh, or ≥90 mAh.

Statement 74: The battery of statement 69, wherein the battery comprises a capacity from about 35 mAh to about 90 mAh.

Statement 75: The battery of statement 69, wherein the battery comprises a specific capacity ranging from between 100 mAh/g to 500 mAh/g.

Statement 76: The battery of statement 75, wherein the battery comprises a specific capacity ranging from between 200 mAh/g to 400 mAh/g.

Statement 77: The battery of statement 75, wherein the battery comprises a specific capacity ranging from between 225 mAh/g to 275 mAh/g.

Statement 78: The battery of statement 67, wherein the cathode comprises a polyol reduced graphene and a plurality of dopants.

Statement 79: The battery of statement 78, further comprising an electrolyte comprising an ionic liquid.

Statement 80: The battery of statement 79, wherein the ionic liquid comprises 1-butyl-1-methylpyrrolidinium bis(trifluoromethylsulfonyl)imide.

Statement 81: The battery of statement 79, wherein the battery further comprises one or more additives.

Statement 82: The battery of statement 81, wherein the one or more additives comprises a salt additive, a non-salt additive, or a combination thereof.

Statement 83: The battery of statement 82, wherein the non-salt additive comprises a carbonate additive, a sulfite additive, or a combination thereof.

Statement 84: The battery of statement 83, wherein the carbonate additive comprises fluoroethylene carbonate.

Statement 85: The battery of statement 83, wherein the sulfite additive comprises ethylene sulfite.

Statement 86: The battery of statement 82, wherein the salt additive comprises a lithium salt.

Statement 87: The battery of statement 86, wherein the lithium salt comprises lithium bis(trifluoromethanesulfonyl)imide (LiTFSI), lithium hexafluorophosphate (LiPF$_6$), or a combination thereof.

Statement 88: The battery of statement 81, wherein the one or more additives form a stable solid electrolyte interphase.

Statement 89: An electrode material comprising graphene, a plurality of dopants, and a plurality of pores.

Statement 90: The electrode material of statement 89, wherein the plurality of pores are interconnected.

Statement 91: The electrode material of statement 89, wherein the plurality of dopants comprises nitrogen, sulfur, phosphorous, boron, transition metals, or a combination thereof.

Statement 92: The electrode material of statement 89, wherein the plurality of dopants comprises nitrogen and sulfur.

Statement 93: The electrode material of statement 89, wherein the plurality of pores comprises an average pore size ranging from 0.5 nm to 55 nm.

Statement 94: The electrode material of statement 93, wherein the plurality of pores comprises an average pore size ranging from 5 nm to 50 nm.

Statement 95: The electrode material of statement 89, wherein the plurality of pores comprises a surface area ranging from 400 m$^2$/g to 1000 m$^2$/g.

Statement 96: The electrode material of statement 95, wherein the plurality of pores comprises a surface area ranging from 500 m$^2$/g to 800 m$^2$/g.

Statement 97: The electrode material of statement 89, wherein the plurality of pores comprises an average pore volume ranging from 0.2 cm$^3$/g to 2.0 cm$^3$/g.

Statement 98: The electrode material of statement 97, wherein the plurality of pores comprises an average pore volume ranging from 0.5 cm$^3$/g to 1.0 cm$^3$/g.

Statement 99: The electrode material of statement 89, wherein the plurality of pores comprises an average depth ranging from 5 nm to 150 nm.

Statement 100: The electrode material of statement 99, wherein the plurality of pores comprises an average depth ranging from 10 nm to 100 nm.

Statement 101: The electrode material of statement 92, wherein the nitrogen and sulfur are derived from natural polymers, thioacetamide, sodium sulfide, elemental sulfur, thiourea, or combinations thereof.

Statement 102: The electrode material of statement 101, wherein the natural polymers comprise cellulose, alginate, lignin, or combinations thereof.

Statement 103: The electrode material of statement 91, wherein the electrode material formula is $C_xN_yS_zO_w$.

Statement 104: The electrode material of statement 103, wherein the formula is $C_6N_2S$.

Statement 105: The electrode material of statement 89, wherein the electrode has an electrical conductivity ranging from 1000 S/m to 5000 S/m.

Statement 106: The electrode material of statement 89, wherein the electrode has a specific surface area ranging from 500 m$^2$/g to 1500 m$^2$/g.

Statement 107: The electrode material of statement 89, wherein the electrode has a capacity retention of over 90% after one thousand cycles of charge/discharge cycles.

Statement 108: A composition comprising a porous graphene doped with nitrogen and sulfur.

Statement 109: The composition of statement 108, further comprising deionized water, residual acid, and/or a cross-linking agent.

Statement 110: The composition of statement 108, wherein the porous graphene doped with nitrogen and sulfur is suitable for use as an electrode material.

What is claimed is:

1. An electrode material comprising graphene, a plurality of dopants, and a plurality of pores;
   wherein the plurality of dopants comprises nitrogen, sulfur, phosphorous, boron, oxygen, transition metals, or a combination thereof;
   wherein formula of the electrode material is $C_xN_yS_zO_w$; and
   wherein x is 1 to 10, y is 1-20, w is 2-20, and z is 0.5-5.

2. The electrode material of claim 1, wherein the plurality of pores are interconnected.

3. The electrode material of claim 1, wherein the plurality of pores comprises an average pore size ranging from 0.5 nm to 55 nm.

4. The electrode material of claim 3, wherein the plurality of pores comprises an average pore size ranging from 5 nm to 50 nm.

5. The electrode material of claim 1, wherein the plurality of pores comprises a surface area ranging from 400 m$^2$/g to 1000 m$^2$/g.

6. The electrode material of claim 5, wherein the plurality of pores comprises a surface area ranging from 500 m$^2$/g to 800 m$^2$/g.

7. The electrode material of claim 1, wherein the plurality of pores comprises an average pore volume ranging from 0.2 cm$^3$/g to 2.0 cm$^3$/g.

8. The electrode material of claim 7, wherein the plurality of pores comprises an average pore volume ranging from 0.5 cm$^3$/g to 1.0 cm$^3$/g.

9. The electrode material of claim 1, wherein the plurality of pores comprises an average depth ranging from 5 nm to 150 nm.

10. The electrode material of claim 9, wherein the plurality of pores comprises an average depth ranging from 10 nm to 100 nm.

11. The electrode material of claim 1, wherein the electrode has an electrical conductivity ranging from 1000 S/m to 5000 S/m.

12. The electrode material of claim 1, wherein the electrode has a specific surface area ranging from 500 m$^2$/g to 1500 m$^2$/g.

13. The electrode material of claim 1, wherein the electrode has a capacity retention of over 90% after one thousand cycles of charge/discharge cycles.

14. A battery comprising electrodes, an electrolyte, and a separator, wherein the electrodes comprise the electrode material of claim 1.

15. The battery of claim 1, wherein the battery has a capacity retention of over 90%.

16. The battery of claim 14, wherein the battery is a coin cell battery.

17. The battery of claim 16, wherein the voltage is ≥4.3 V, ≥4.2 V, ≥4.1 V, ≥4.0 V, ≥3.9 V, ≥3.8 V, or ≥3.7 V.

18. The battery of claim 16, wherein the voltage is higher than 3.6 V lithium-ion coin cell batteries.

19. The battery of claim 16, wherein the battery comprises a capacity from about 35 mAh to about 90 mAh.

20. The battery of claim 16, wherein the battery comprises a specific capacity ranging from between 100 mAh/g to 500 mAh/g.

21. The battery of claim 14, wherein the cathode comprises a polyol reduced graphene and a plurality of dopants.

22. The battery of claim 21, wherein the electrolyte is an ionic liquid.

23. The battery of claim 22, wherein the ionic liquid is 1-butyl-1-methylpyrrolidinium bis(trifluoromethylsulfonyl) imide.

24. The battery of claim 22, wherein the battery further comprises one or more additives.

25. The battery of claim 24, wherein the one or more additives comprises a salt additive, a non-salt additive, or a combination thereof.

26. The battery of claim 25, wherein the non-salt additive comprises a carbonate additive, a sulfite additive, or a combination thereof.

27. The battery of claim 26, wherein the carbonate additive comprises fluoroethylene carbonate.

28. The battery of claim 26, wherein the sulfite additive comprises ethylene sulfite.

29. The battery of claim 25, wherein the one or more additives form a stable solid electrolyte interphase.

* * * * *